(12) United States Patent
Arditti Ilitzky et al.

(10) Patent No.: US 10,531,382 B2
(45) Date of Patent: Jan. 7, 2020

(54) OFFLOADING MAC/LINK LAYER FUNCTIONS

(71) Applicant: Intel Corporation, Santa Clara, CA (US)

(72) Inventors: David Arditti Ilitzky, Guadalajara (MX); Jorge Hermosillo, Zapopan (MX); Jorge Carballido Gamio, Zapopan (MX); Arturo Veloz, Tlajomulco de Zuniga (MX); Venkatesh Rajendran, Cupertino, CA (US); Jorge Romero Aragon, Zapopan (MX); Carlos A. Flores Fajardo, Tlaquepaque (MX); Rodrigo Varela Leos, Zapopan (MX); Bernard Deadman, Austin, TX (US)

(73) Assignee: Intel Corporation, Santa Clara, CA (US)

(*) Notice: Subject to any disclaimer, the term of this patent is extended or adjusted under 35 U.S.C. 154(b) by 98 days.

(21) Appl. No.: 15/627,975

(22) Filed: Jun. 20, 2017

(65) Prior Publication Data

US 2018/0368192 A1    Dec. 20, 2018

(51) Int. Cl.
| | |
|---|---|
| *H04W 52/02* | (2009.01) |
| *H04W 84/18* | (2009.01) |
| *H04L 1/00* | (2006.01) |
| *H04L 29/12* | (2006.01) |
| *H04L 12/40* | (2006.01) |

(52) U.S. Cl.
CPC ....... *H04W 52/0219* (2013.01); *H04L 1/0044* (2013.01); *H04L 29/12839* (2013.01); *H04L 61/6022* (2013.01); *H04L 2012/40254* (2013.01); *H04W 52/02* (2013.01); *H04W 84/18* (2013.01)

(58) Field of Classification Search
CPC . H04W 52/0219; H04W 52/02; H04W 84/18; H04L 1/0044; H04L 29/12839; H04L 61/6022; H04L 2012/40254
See application file for complete search history.

(56) References Cited

U.S. PATENT DOCUMENTS

| | | | | |
|---|---|---|---|---|
| 6,134,662 | A * | 10/2000 | Levy | G06F 21/606 713/160 |
| 8,498,229 | B2 * | 7/2013 | Sood | G06F 1/3209 370/311 |
| 9,846,471 | B1 * | 12/2017 | Arora | G06F 1/3231 |
| 2008/0092016 | A1 * | 4/2008 | Pawlowski | G06F 11/1044 714/764 |
| 2009/0270030 | A1 * | 10/2009 | Jia | H04B 1/1615 455/39 |

(Continued)

*Primary Examiner* — Andrew Lai
*Assistant Examiner* — Harry H Kim
(74) *Attorney, Agent, or Firm* — Schiff Hardin LLP

(57) ABSTRACT

A wireless device having processor circuitry; and a hardware circuit configured to implement, during an active steady-state of a Medium Access Control/Link Layer (MAC/LL) with scheduled channel access, a MAC/LL function without processor circuitry intervention, wherein the steady-state is a state that is control packet transmission free for managed connections in connection oriented communications or a continuous broadcast or scan operation in connectionless communications.

25 Claims, 23 Drawing Sheets

(56) References Cited

U.S. PATENT DOCUMENTS

| | | | |
|---|---|---|---|
| 2011/0019774 A1* | 1/2011 | Furuta | G06F 8/65 |
| | | | 375/340 |
| 2012/0284551 A1* | 11/2012 | Zhao | G06F 1/3206 |
| | | | 713/323 |
| 2013/0128784 A1* | 5/2013 | Nakao | H04L 12/6418 |
| | | | 370/310 |
| 2013/0159479 A1* | 6/2013 | Vasseur | H04L 47/10 |
| | | | 709/221 |
| 2016/0337540 A1* | 11/2016 | Fujisawa | H04N 1/00891 |

* cited by examiner

Dynamic-Aperiodic Schedule

Queue

Static-Periodic Schedule

Circular Buffer
Multiple Elements

Static Single-Event Schedule

Circular Buffer
Single Element

Steady-State for Single Connection-Oriented (Slave) Transport

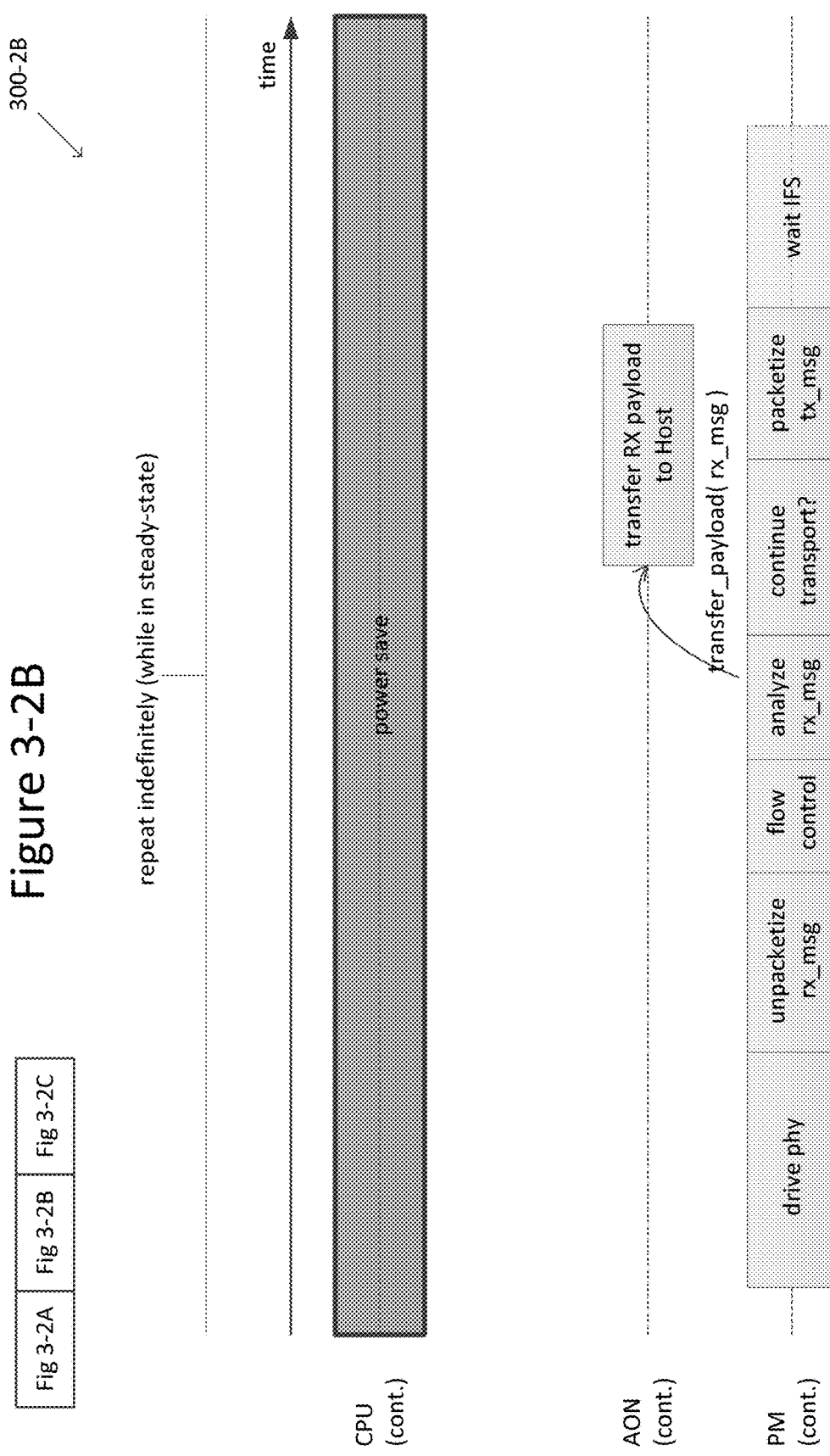

Example Implementation for Multi-Processor System

Example Implementation for Single Processor SoC

OFFLOADING MAC/LINK LAYER FUNCTIONS

BACKGROUND

A Wireless Sensor/Actuator Network (WSAN) is a group of sensors that gather information about their environment and communicate wirelessly with actuators that interact with the environment. In many scenarios the WSAN devices are power constrained, which imposes restrictions on wireless communication subsystem in such devices. There is a general incompatibility between design flexibility and a low-power consumption requirement for implementation of Medium Access Control/Link Layer (MAC/LL), which is Layer 2 of a protocol stack.

Wireless connectivity protocols with scheduled channel access are prevalent for WSAN in wearable devices and the Internet of Things (IoT). In a WSAN, slave (sensor or actuator) nodes have low wireless activity duty cycles; as an example, in some scenarios fast connections present duty cycles of approximately 2%, while slow connections present duty cycles of approximately 0.02%. Therefore, wireless idle-time power optimization is a significant Key Performance Indicator (KPI) factor. This optimization is inherent in MAC/LL design because real-time mechanisms that handle the air interface protocol in wireless connectivity pertain to the MAC/LL. Upper layers of the protocol stack are decoupled from air interface timing, and coupled to host application execution time. Therefore MAC/LL design is a main focus for optimizations targeting wireless idle-time power consumption.

In order to reduce the Time-To-Market (TTM) for WSAN devices, conventional systems use programmable Central Processing Units (CPUs) (e.g., General Purpose Processor (GPP), Micro Controller Unit (MCU), etc.), and implement most of the MAC/LL protocol as software relying on a real-time control environment, such as Real Time Operating System (RTOS). In such a system, the idle-time power consumption is dominated by the CPU dynamic power consumption (CPU is processing while air interface is idle) and by leakage power from persistent subsystems (such as retention memory) while the CPU is idle.

While the main power consumption in these conventional systems during wireless activity periods comes from the physical layer (PHY), during wireless idle periods the PHY is off, and the main power consumption is by the MAC/LL, that is, from CPU execution and the power leakage due to the program/data that needs to be maintained in memory. For protocols with low wireless activity duty cycles, the wireless idle period power consumption contributes to the total power budget significantly.

BRIEF DESCRIPTION OF THE DRAWINGS

FIGS. 3-2A, 3-2B, and 3-2C illustrate a summarized, dynamic view of steady-state of the MAC/LL architecture in accordance with aspects of the disclosure.

FIGS. 3-3A, 3-3B, and 3-3C illustrate an expanded, dynamic view of steady-state of the MAC/LL architecture in accordance with aspects of the disclosure.

DESCRIPTION OF THE ASPECTS

Figure 1:
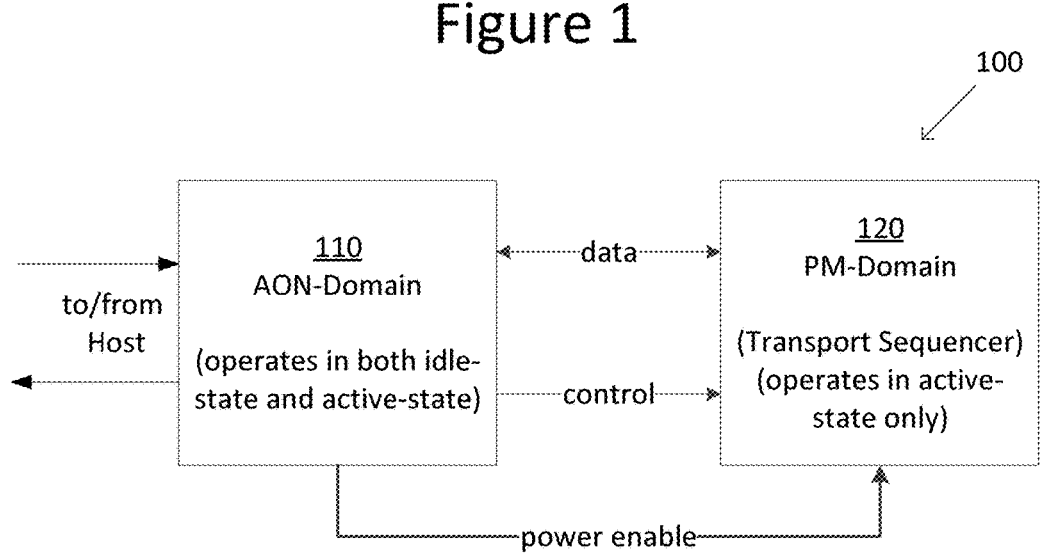
FIG. 1 illustrates a schematic diagram of a Medium Access Control/Link Layer (MAC/LL) architecture in accordance with aspects of the disclosure.

The present disclosure is directed to a low power Medium Access Control Link Layer (MAC/LL) that minimizes Central Processing Unit (CPU) intervention and software memory footprint, to therefore maximize continuous, uninterrupted CPU sleep periods. The architecture for MAC/LL protocols in accordance with aspects of this disclosure relies on generic MAC/LL functionalities offloaded from the CPU into hardware circuits.

The architecture in this disclosure is focused on the Bluetooth-Low Energy (LE) protocol for purposes of description. However, the disclosure is not limited in this respect. The concepts of this disclosure may alternatively be applied to other wireless connectivity protocols with scheduled channel access, such as Bluetooth (BT), ANT, Long Range (LoRa), etc.

I. Architecture Overview

An important scenario for optimization, as it leads to maximum battery life, is power consumption during a steady-state of the communication transport, as this state may last for long periods of time, up to multiple days. "Steady-state" of the communication transport is a non-standard term. For connection-oriented communications, "steady-state" is when all connections have stable schedules and configurations, and a primary use of the transport is for exchanging upper layer, user traffic payloads; the steady-state is broken when a connection is torn down, a new connection needs to be established, or an existing connection must be reconfigured, either by request of the upper layers (above the MAC/LL), or by request of the MAC/LL of a peer device. For connectionless communications, "steady-state" is when there is a continuous broadcast/scan operation, where the MAC/LL reports discovered devices or scanned PDUs to upper layers (i.e., higher than the MAC/LL); the steady-state is broken when upper layers request to end the steady-state, or when specific PDUs are received, such as for connection requests, etc.

The architecture of this disclosure is based on at least the following five principles:

First, hardware circuits implement protocol real-time mechanisms that are generic to most wireless connectivity protocols with scheduled channel access within a limited scope of reconfigurability. These circuits offload the CPU to reduce the CPU's activity time as well as the software memory footprint.

Second, the software (CPU) executes policies ahead-of-time to create stored micro-controls for the hardware circuits, which execute the micro-controls just-in-time. Once created, the stored micro-controls may be executed several times, such as during long time periods when the CPU is inactive.

Third, some hardware circuit(s) are Always-On (AON-domain), while other circuit(s) are Power Managed (PM-domain). The AON-domain is in charge of sequencing the power state(s) of the module(s) in the PM-domain; the CPU can stay asleep during this power sequencing.

Fourth, when all hardware circuits are implemented, a steady-state operation of the MAC/LL protocol can be carried out without CPU intervention. The result is minimal power consumption may be achieved, as if the entire MAC/LL protocol were implemented in hardware, but without the inflexibility penalty.

Fifth, the architecture enables specific functionalities to be disabled for specific scenarios when portions of the MAC/LL protocol are not implemented, that is, if a wireless device is an observer only or a broadcaster only, etc.

FIG. 1 illustrates a schematic diagram of a Medium Access Control/Link Layer (MAC/LL) architecture 100 in accordance with aspects of the disclosure.

The architecture 100 may be referred to as a Maximally Offloaded MAC/LL (MO-MACLL) architecture. The MO-MACLL architecture 100 is optimized to reduce power consumption (i.e, CPU execution time and software memory footprint) during the steady-state (defined above) of the MAC/LL.

The MO-MACLL architecture 100 offloads MAC/LL functions from a CPU into two hardware partitions—an Always-On Domain (AON-Domain) 110 and a Power Managed Domain (PM-Domain) 120. The PM-Domain 120 operates only during an active-state of the MAC/LL, and offloads the complete air interface protocol; the rest of the time the PM-Domain 120 is powered down. The AON-Domain 110 is active throughout the steady-state operation (both in active-state and idle-state of the MAC/LL), and is configured to set up the PM-Domain 120, while servicing the host continuously. The host is defined as the upper layers above the MAC/LL.

Figure 2:
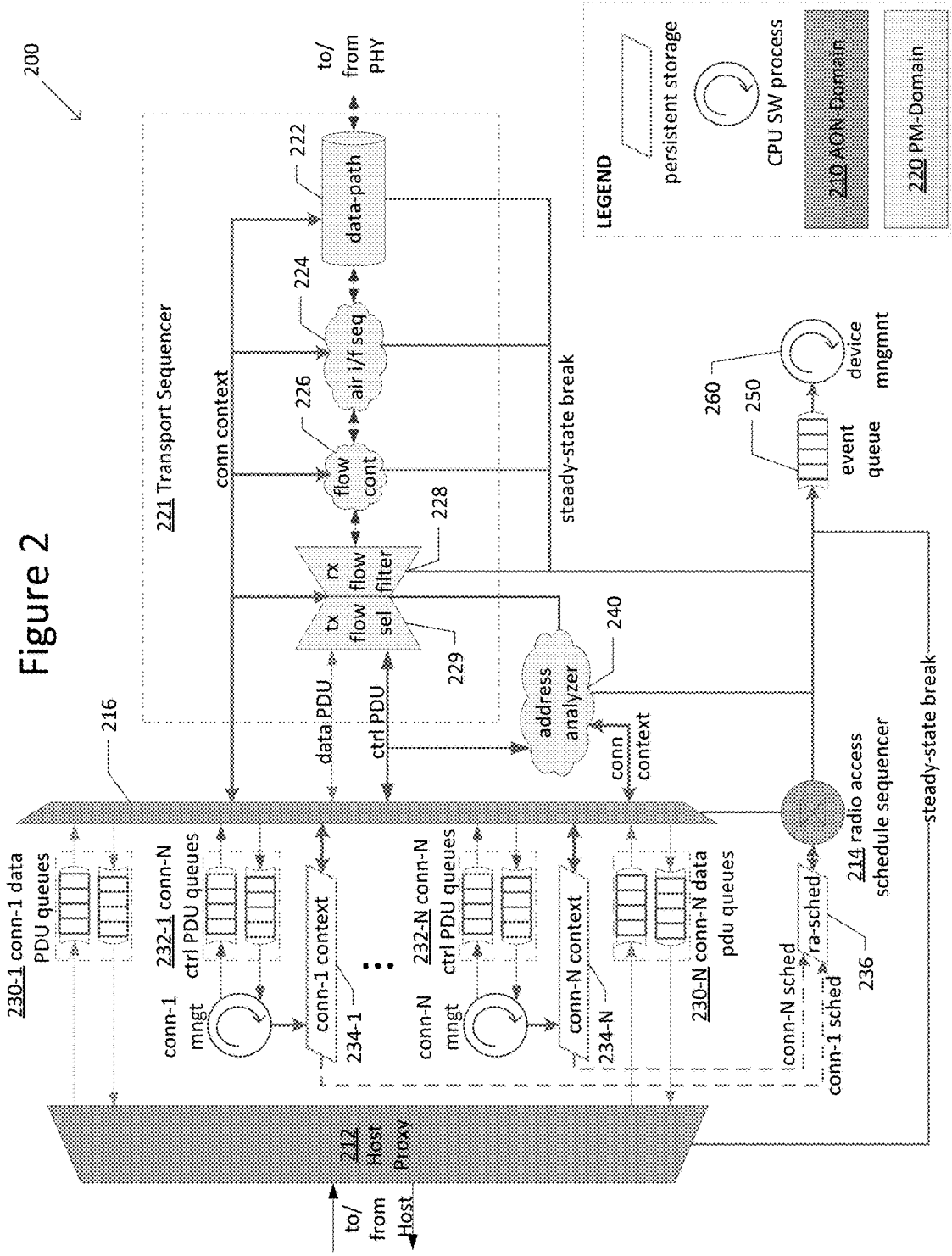
FIG. 2 illustrates a functional static view of the MAC/LL architecture in accordance with aspects of the disclosure.

FIG. 2 illustrates a functional static view of the MO-MACLL 200, which represents a detailed view of the architecture 100. The MO-MACLL 200 can simultaneously manage a plurality of communication transports. For connection-oriented communications, the MO-MACLL 200 can simultaneously manage multiple connection oriented transports in accordance with aspects of the disclosure. For connectionless communications, the MO-MACLL 200 may simultaneously manage multiple connectionless transports, each of which can be used for either broadcasting only, advertising accepting data requests and supporting data responses, advertising accepting connection requests, scanning only (sniffing), scanning supporting data requests and accepting data responses, or scanning supporting connection requests. Unless otherwise stated, the features of the MO-MACLL 200 described herein apply to both connection-oriented transports and connectionless transports, therefore the term connection (conn-#, where # represents the connection identifier) will be used to generically refer to both concepts.

Each of the two partitions (AON-Domain 210 and PM-Domain 220) encapsulates multiple MAC/LL generic functions. The functions pertaining to the AON-domain 212, 214, 216 (correspond with 110) are depicted in dark grey, while the function pertaining to the PM-domain 221, 240 (corresponds with 120) are depicted in light grey.

The AON-domain 210 encapsulates three main functions—a radio access schedule sequencer 214, a host proxy 212, and a PDU queue and context selector (multiplexer) 216 which is controlled by the radio access schedule sequencer 214. The AON-domain 210 encapsulates multiple persistent data structures per managed connection oriented transport or connectionless transport (conn-#), that is, these data structures will hold their values even when the PM-Domain 120 is powered off. The persistent data structures existing per managed connection are: the connection's data PDU queues (one incoming and one outgoing) 230-# (where # represents the connection identifier), the connection's control PDU queues (one incoming and one outgoing) 232-# (where # represents the connection identifier), and the connection's context 234-# (where # represents the connection identifier). Each managed connection context 234-# includes the configuration, state and micro-controls corresponding to the corresponding managed connection (conn-#). For the case of connectionless transports, the connection's context 234-# (where # represents the connectionless transport identifier) will contain peer device address data structures as part of the configuration.

The radio access schedule sequencer 214 is part of the control-plane for the MAC/LL, and is configured to handle the sequencing of active-state and idle-state for the MAC/LL protocol during steady-state operation. The radio access schedule sequencer 214 controls the sharing of the transport sequencer 221 and the address analyzer 240 in a time-multiplexed fashion between the plurality of connections (conn-#) managed by the device, according to a software defined radio access schedule 236. In order to share the transport sequencer 221 and the address analyzer 240 between the plurality of managed connections, the radio access schedule sequencer 214 controls the selector (multiplexer) 216 to select the data PDU queues 230-#, control PDU queues 232-#, and connection context 234-# that correspond to the currently serviced connection (conn-#). The radio access schedule sequencer 214 handles the power sequencing of the transport sequencer 221 and the address analyzer 240, selects the currently serviced connection context and queues, and triggers their execution for the granted amount of time according to the radio access schedule 236. The radio access schedule sequencer 214, upon triggering the execution of the transport sequencer 221 and the address analyzer 240, may also pass other protocol specific configuration information which may be encoded in the radio access schedule 236. The radio access schedule sequencer 214 can sequence either a single radio access schedule, or simultaneously sequence multiple radio access schedules, both cases allowing support for multiple simultaneous connections. If multiple simultaneous connections are to be supported in a single radio access schedule 236, then the schedule itself must encode information regarding the number of radio access denials each connection will suffer due to the schedule. If multiple radio access schedules exist for simultaneous execution, the radio access schedule sequencer 214 handles the conflict resolution between the simultaneous radio access schedule executions, while keeping track of the number of radio access denials each of the managed connection has suffered, and updating this information in the corresponding radio access schedule if needed. The radio access schedule sequencer 214 may be configured to handle timing corrections (window widening for connection oriented transports) and time randomizations (for connectionless transports quasi-periodicity or backoff), on a per-connection basis, as part of the active/idle sequencing, and under such configuration it is able to update the radio access schedule 236.

The host proxy 212 is part of the data-plane of the MAC/LL, and is configured to handle the data PDU exchange with upper layers, that is, the host. The host proxy 212 controls message transport to/from the host, handles the message type parsing (i.e. data message vs. command message) for all incoming messages from the host, and automatically handles the data message flow control to/from the host, but delegates to CPU the parsing/generation of command/event messages and its flow control from/to the host. The host proxy 212 may also be configured to automatically generate and transmit event messages to the host to send out reports while maintaining the steady-state when support for connectionless communications is required (i.e. when managing connectionless transports).

The PM-domain 220 offloads from the CPU all the real-time transport mechanisms that may be reused by all of the managed connections during their active states according to the MAC/LL protocol. The PM-domain 220 encapsulates two main functions—a transport sequencer 221, and an address analyzer 240.

The transport sequencer 221 is in charge of performing all required functions to reliably exchange Packet Data Units (PDUs) with one or more peer devices over the air, in a micro-controllable manner, to provide the desired flexibility. In order to reuse the transport sequencer 221 for different connections, it needs to be provided with a connection context 234-#, that is, a set of state updatable variables, configuration variables, and micro-controls specific for that connection, which may persist in between activity periods (i.e. during power cycles).

The transport sequencer 221 encapsulates a data-path 222, an air interface sequencer 224, a flow controller 226, a reception flow filter 228, and a transmission flow selector 229, which represent functions to be offloaded from the CPU during steady-state.

The data-path 222 is configured, through the currently selected connection context 234-#, to perform PDU packetizing and bitstream processing. The data-path 222 may be micro-controlled to perform any bitstream processing tasks (e.g., cyclic redundancy check (CRC), Forward Error Correction (FEC), scrambling, encryption, etc.) and packetization of the bitstream for transmission, as well as the reverse operations for reception, with different options for every task (e.g., different polynomials, seeds, keys, etc.). The data-path 222 may have state variables, stored in the currently selected connection context 234-#, to allow it to update bitstream processing related variables that may evolve in time if the protocol requires it (e.g., CRC initialization, scrambling initialization, etc.).

The air interface sequencer 224 is configured, through the currently selected connection context 234-#, to sequence the over-the-air transmission, reception, and wait operations; waits are required to implement inter-packet spacings, etc. The air interface sequencer 224 handles all the dynamic parameters of the air interface specified by the protocol (e.g., channel hopping rules, inter packet spacing rules, transmission and reception alternation rules, etc.). These dynamic parameters represent state variables for the air interface sequencer 224, which is stored on the currently selected connection context 234-#. The air interface sequencer 224 may drive reconfigurations of the PHY in accordance to the air interface dynamic parameters. The air interface sequencer 224 may be programmed, through the currently selected connection context 234-#, to follow different sequences, depending on a protocol's requirements.

The flow controller 226 is configured, through the currently selected connection context 234-#, to discard duplicate reception PDUs, and track which transmission PDUs have been acknowledged by a peer device to remove the transmission PDUs from the corresponding transmission PDU queue. The flow controller 226 also enables the creation of empty packets (no PDU) to keep a packet exchange over the air interface going. The flow controller 226 may be programmed, through the currently selected connection context 234-#, to use different flow control mechanisms, such as ACK/NACK, sliding window, sequence number, credit based, etc. The flow controller 226 has state variables, stored in the currently selected connection context 234-#, to track the flow control state between activity periods (i.e., power cycles).

The transmission flow selector 229 is configured, through the currently selected connection context 234-#, to arbitrate between outstanding transmissions data PDUs and control PDUs. The transmission flow selector 229 may also be programmed, through the currently selected connection context 234-#, to use different rules, such as priority, round robin, deadline based, first-come-first-served, barriers, etc. The transmission flow selector 229 may also be programmed to filter out outgoing data or control PDUs based on their age, i.e. allowing PDUs to have an expiration date.

The reception flow filter 228 is configured, through the currently selected connection context 234-#, to separate reception PDUs into data and control flows, as control PDUs will usually break the steady-state, that is, wakeup/interrupt the CPU to delegate control. The reception flow filter 228 may be programmed, through the currently selected connection context 234-#, to parse PDUs and search for specific field values to perform specific tasks, such as to filter packets during the discovery stage of WSAN, or for connectionless data exchange.

The transmission flow selector 229 and reception flow filter 228 may have shared state, stored in the currently selected connection context 234-#, in order to enable complex flow behavior pertaining both the transmission and reception directions. One example of such complex flow behavior is the barrier mechanism. The barrier mechanism allows the transmission flow selector 229 to create a virtual barrier at any location (e.g., at the head, at the tail, or some specific intermediate location) of the currently selected outgoing data PDU queue or outgoing control PDU queue. Whenever this barrier is reached on the queue, no further PDUs from that queue will be selected for transmission until the barrier is removed. Barriers may be set or removed by outgoing control PDUs of a specific type (by programming transmission flow selector 229 to parse the packets and create the barrier when such a PDU is found), or by incoming control PDUs of a specific type (by programming reception flow filter 228 to parse packets and create the barrier when such a PDU is found). When steady-state is lost, CPU may also set or remove a barrier. Barriers are useful to implement protocol specific procedures and restrictions; for example, the Link Layer Encryption Procedure in Bluetooth Low Energy. To enable support for connectionless communications, the transmission flow selector 229 and reception flow filter 228 may interact with the address analyzer 240 to enable PDU flow control operations dependent on the peer's device address, e.g. reception flow blocking dependent on the peer's device address, transmission flow blocking dependent on the peer's device address, or transmission flow selection dependent on the peer's device address.

The address analyzer 240 is in charge of performing all the device address based analysis, filtering, and reporting decision operations to enable connectionless communication support. The address analyzer interacts with the transmission flow selector 229 and reception flow filter 228 to retrieve the PDU type information and device address information from the PDUs flowing through 229 and 228, and uses this information to evaluate incoming PDU filtering policies, outgoing PDU enabling policies, and peer device reporting (to the host) policies dependent. In order to reuse the address analyzer 240 for distinct connectionless transports, it needs to be provided with a connection context 234-#, that is, a set of state updatable variables, configuration variables and micro-controls specific for the connectionless transport, which may persist between activity periods (i.e. during power cycles). While the device address data structures, specifying groups of peer device addresses with similar permissions, can be represented as configuration variables in the connection context 234-#, the filtering, enabling, and reporting policies are more flexibly represented as micro-controls in the connection context 234-#.

The address analyzer 240 is optional. If there is no need to use offloads for connectionless communications, then address analyzer may be omitted.

The CPU software processes (depicted as circles with a circular arrow inside) are in charge of connection management tasks, including connection creation and setup, connection context initialization, connection context updating, and connection tear-down. When the CPU performs management tasks, the MO-MACLL 200 is not in steady-state operation, and CPU is in charge of driving the MAC/LL operation, that is, directly driving the execution of the transport sequencer 221 and address analyzer 240 (i.e. replacing the functionality of at least the radio access schedule sequencer 214). In contrast, when the MO-MACLL 200 is in steady-state operation, it executes autonomously while the CPU is idle and therefore the software processes are not executing. The connection (connection oriented transport or connectionless transport) management processes are depicted in the MO-MACLL 200 with labels conn-# mngt.

The AON-domain 210 and PM-domain 220 can wake-up/interrupt the CPU when conditions that end/break the steady-state are detected. For the purpose of specifying the steady-state breaking condition, and to enable multiple such conditions to occur while keeping the order and prevent distinct conditions from masking one another, an event queue 250 may be included in the architecture. The wake-up/interrupt signaling will cause the CPU to wake-up and resume the management of the device, while the event queue 250 will hold the data needed by the CPU to understand what it needs to do. This process is depicted in the MO-MACLL 200 as the software process labelled device mngmnt 260.

Figures 1A, 3:
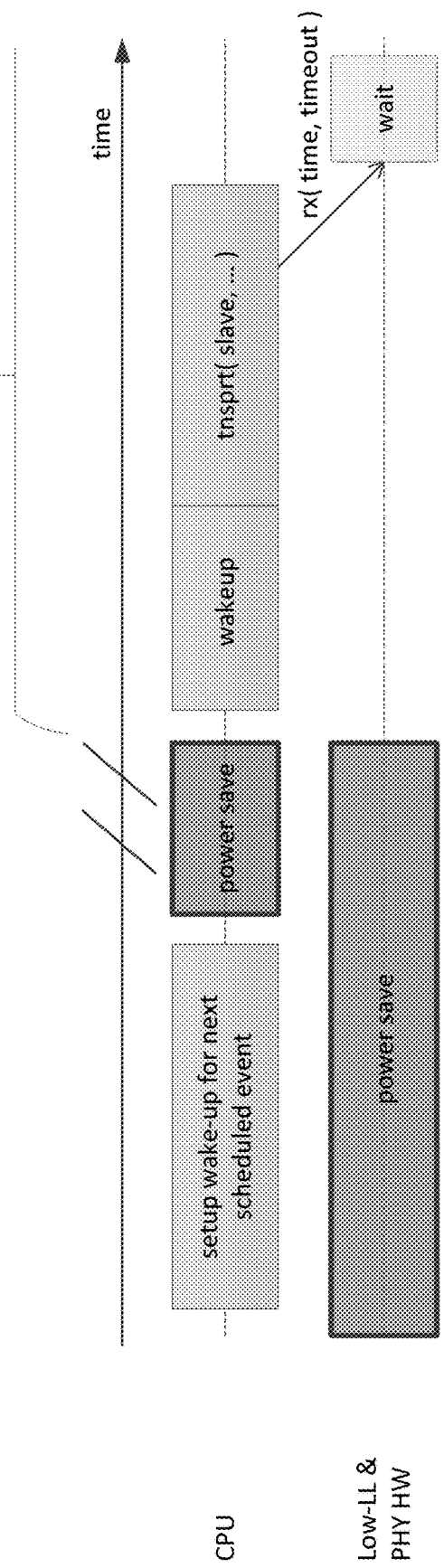
FIGS. 3-1A, 3-1B, and 3-1C illustrate a functional dynamic view of a conventional MAC/LL architecture.
Figures 1B, 3:
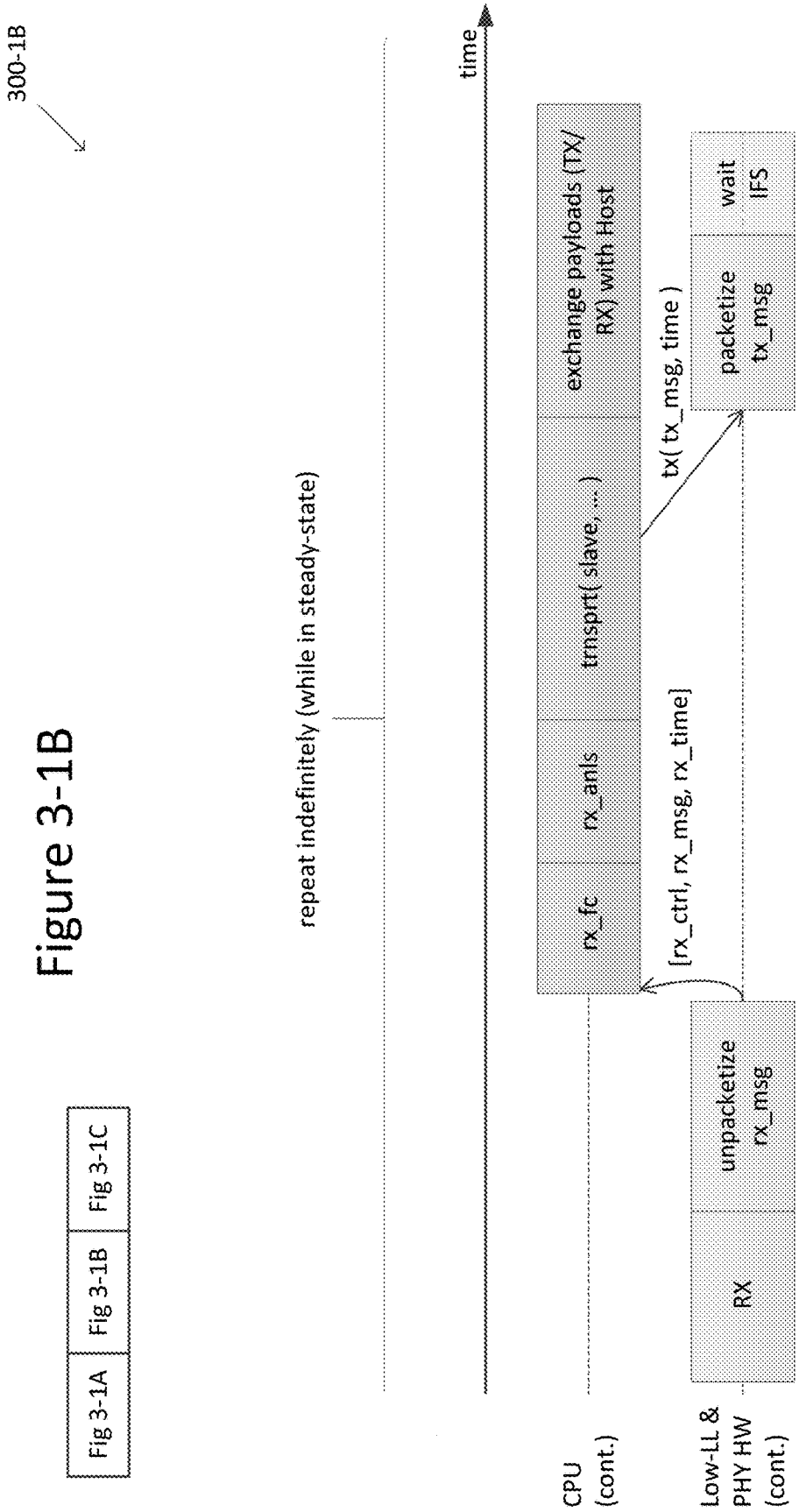
Figures 1C, 3:
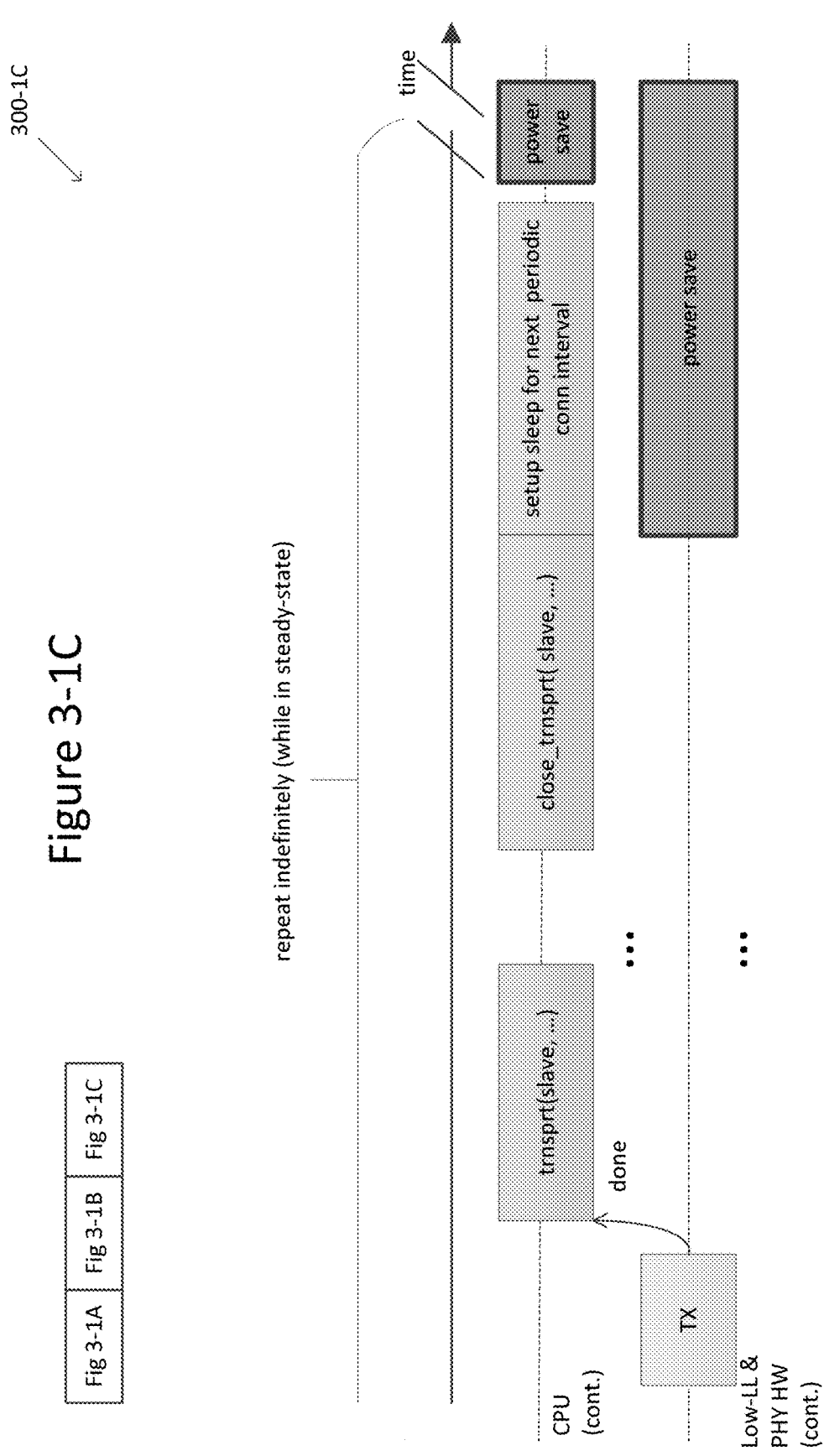

FIG. 3 (comprising FIGS. 3-2A, 3-2B, 3-2C, 3-3A, 3-3B, and 3-3C, along with conventional FIGS. 3-1A, 3-1B, and 3-1C) illustrates a functional dynamic view of the MO-MACLL architecture 200, and due to its detail is spread over nine sheets of drawings, the first three of which are related to a conventional MAC/LL architecture.

By way of overview, FIG. 3 illustrates how upon entering a steady-state operation, the CPU generates (or updates) the corresponding configurations and micro-controls for the hardware circuits, which enable the CPU to sleep continuously during the steady-state operation. Compared with conventional architectures, the architecture of this disclosure offers a significant increase the power saving for the CPU. FIGS. 3-2 and 3-3 also illustrate how all the hard real-time tasks have been completely offloaded from the CPU, as opposed to the conventional architecture illustrated with respect to FIG. 3-1, thus enabling a simplified software/firmware with reduced memory footprint, thereby ultimately reducing memory leakage power, and CPU dynamic power.

FIG. 3-1 (comprising FIGS. 3-1A, 3-1B, and 3-1C) illustrates a functional dynamic view of a conventional MAC/LL architecture. This is a CPU-driven execution, without MAC/LL offloading as disclosed herein.

FIG. 3-2 (comprising FIGS. 3-2A, 3-2B, and 3-2C) illustrates a summarized, dynamic view of the steady-state of the MO-MACLL architecture 200 in accordance with aspects of the disclosure. The AON-domain 210 is shown as a single component, labeled AON, which controls the power sequencing of a single power managed component, which encapsulates the transport sequencer 221 (containing 222, 224, 226, 228, and 229) and the PHY. The brace represents the steady-state operation pattern, that is, a periodic execution sequence that is repeated indefinitely while the device remains in steady-state operation. In FIG. 3-2, the label cntx_id is used to refer to the connection identifier (conn-#) of the corresponding connection context (234-#).

FIG. 3-3 (comprising FIGS. 3-3A, 3-3B, and 3-3C) illustrates an expanded, dynamic view of the steady-state of the MO-MACLL architecture in accordance with aspects of the disclosure. In these figures separate functions and layers are shown. In these figures, the radio access schedule sequencer 214 (part of AON-domain 210), labeled ras-seq, is in charge of power sequencing the transport sequencer 221, labeled trns-seq, and the PHY. In these figures, the host proxy 212 (part of AON-domain 210), labeled hst-proxy, is in charge of exchanging data messages with the upper layers (host). Again, the brace represents the steady-state operation pattern, that is, a periodic execution sequence that is repeated indefinitely while the device remains in steady-state operation. In FIG. 3-3, the label cntx_id is used to refer to the connection identifier (conn-#) of the corresponding connection context (234-#).

Figures 2A, 3:
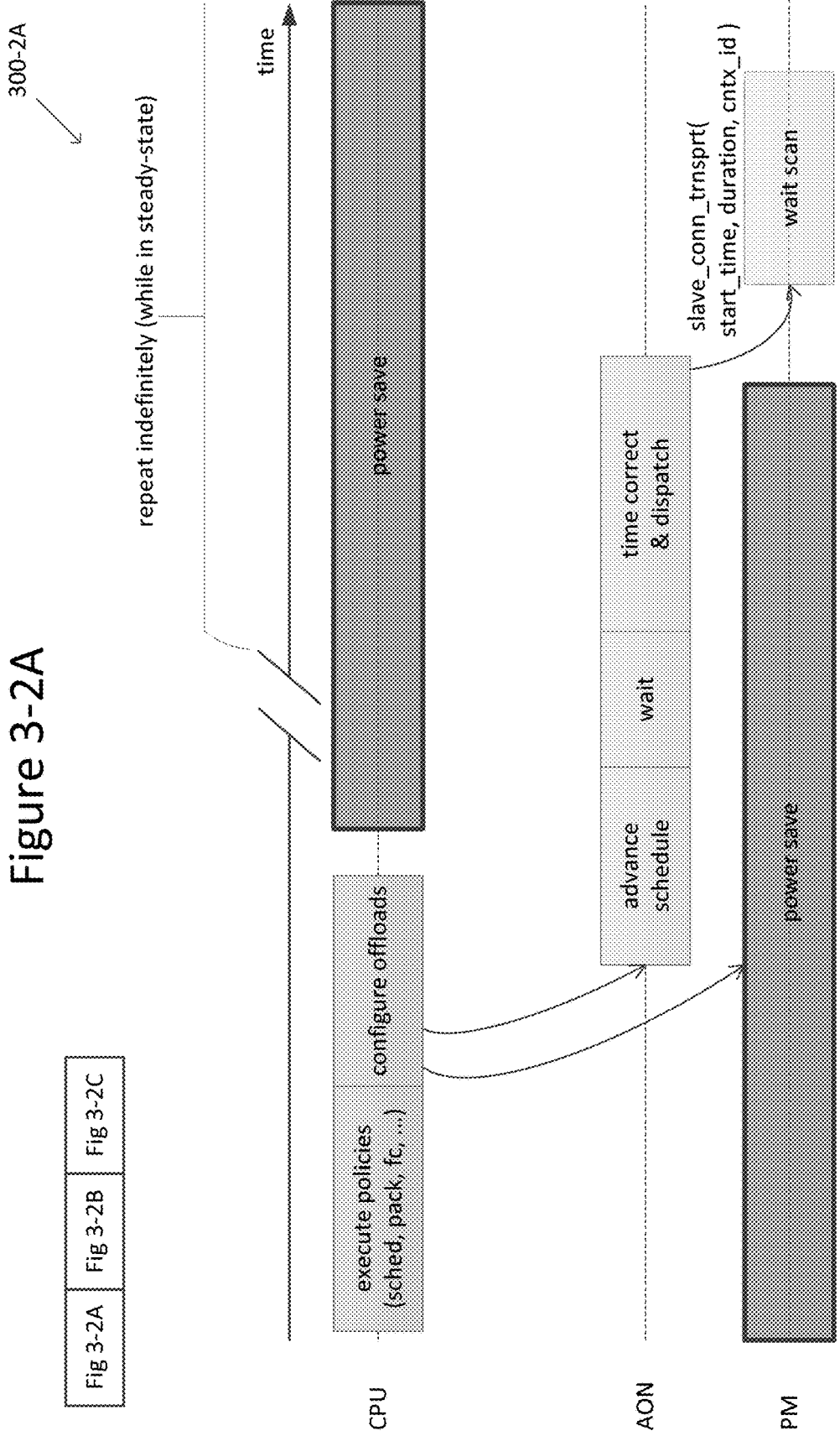
Figures 2C, 3:
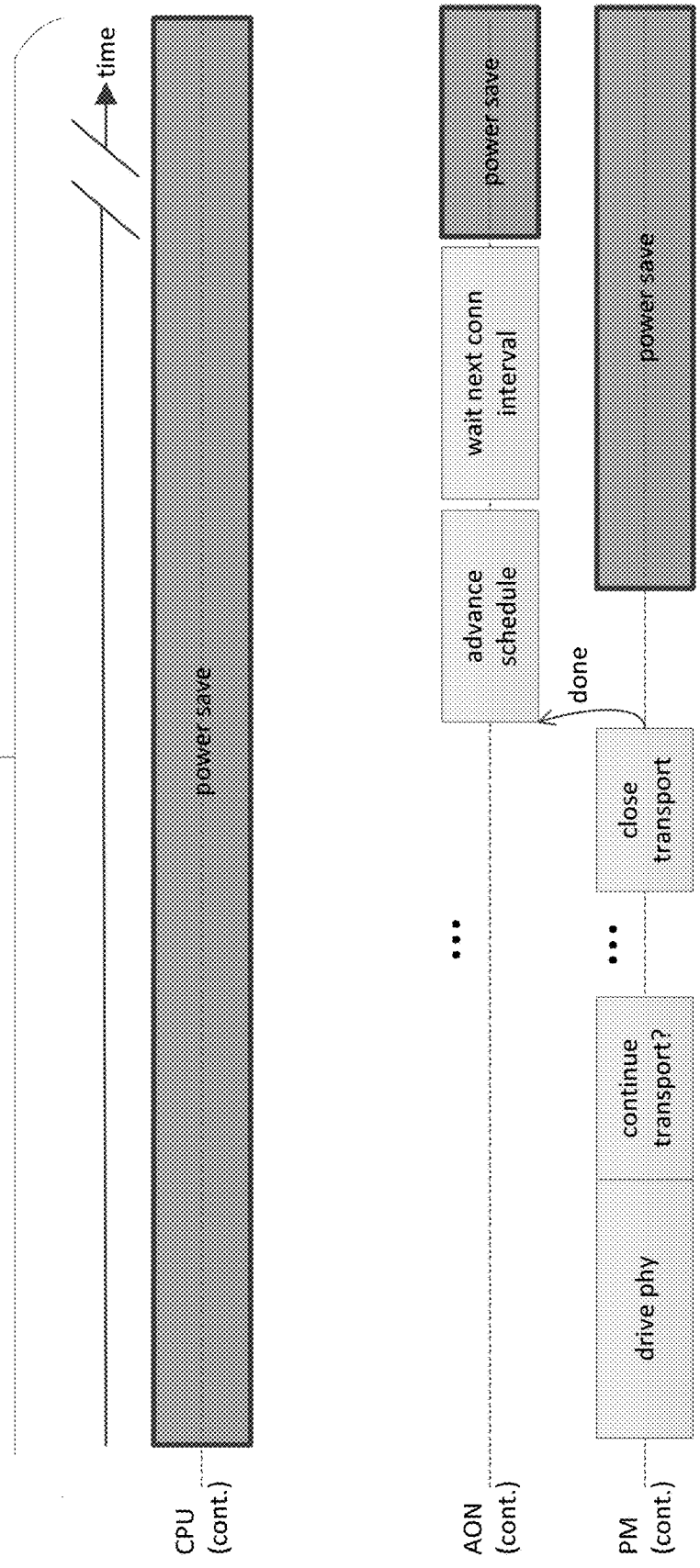
Figures 3, 3A:
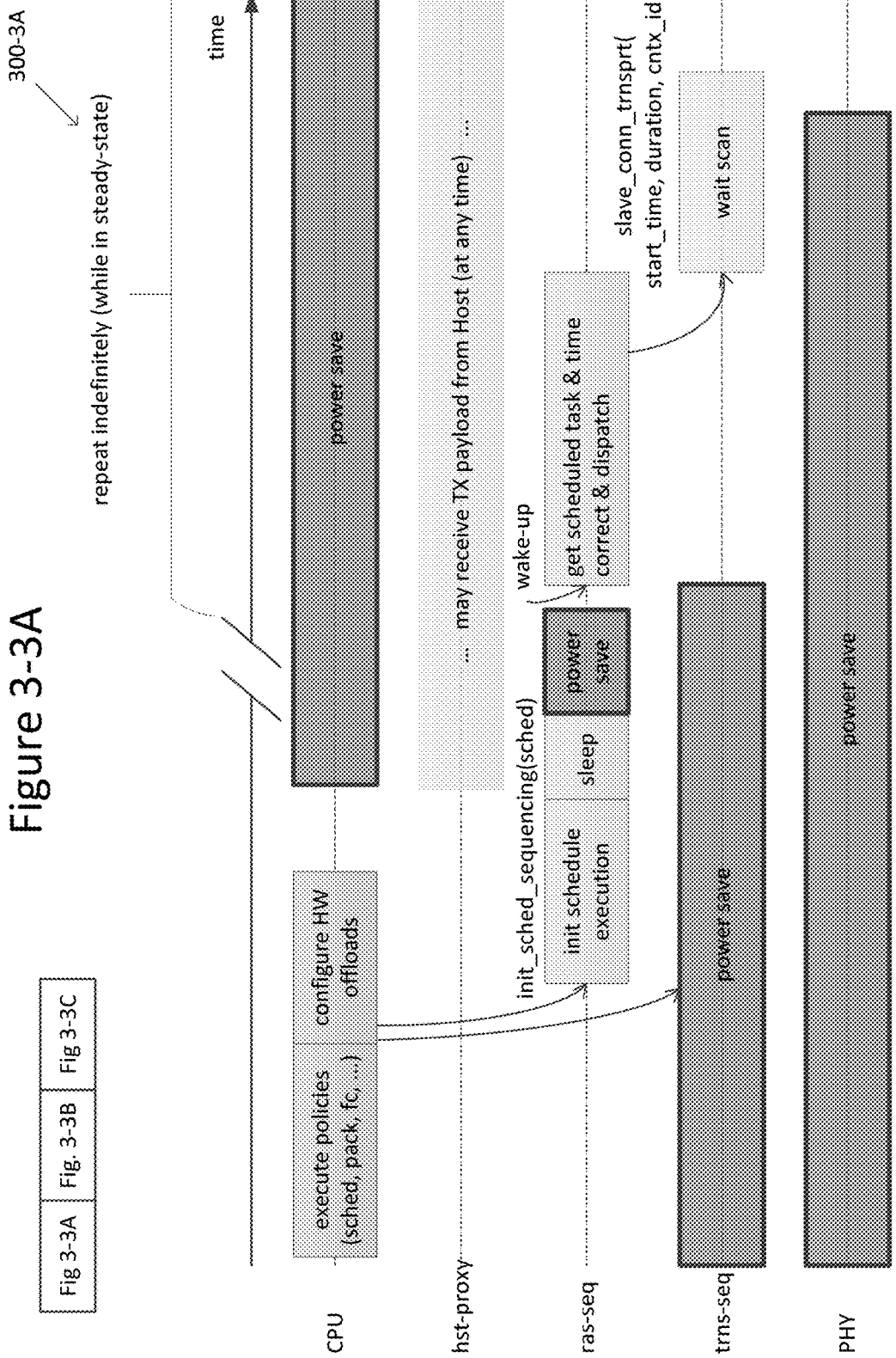
Figures 3, 3B:
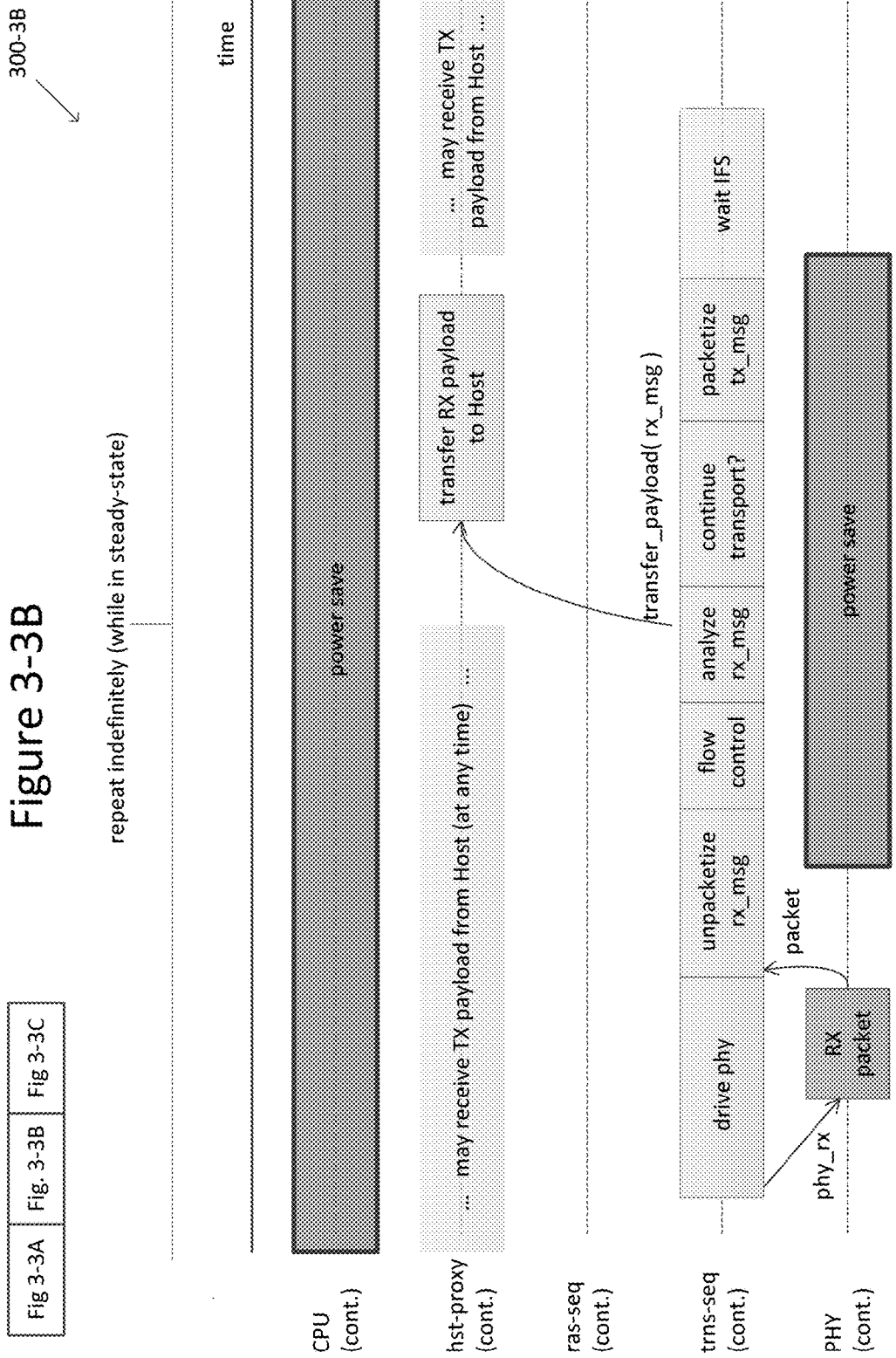
Figures 3, 3C:
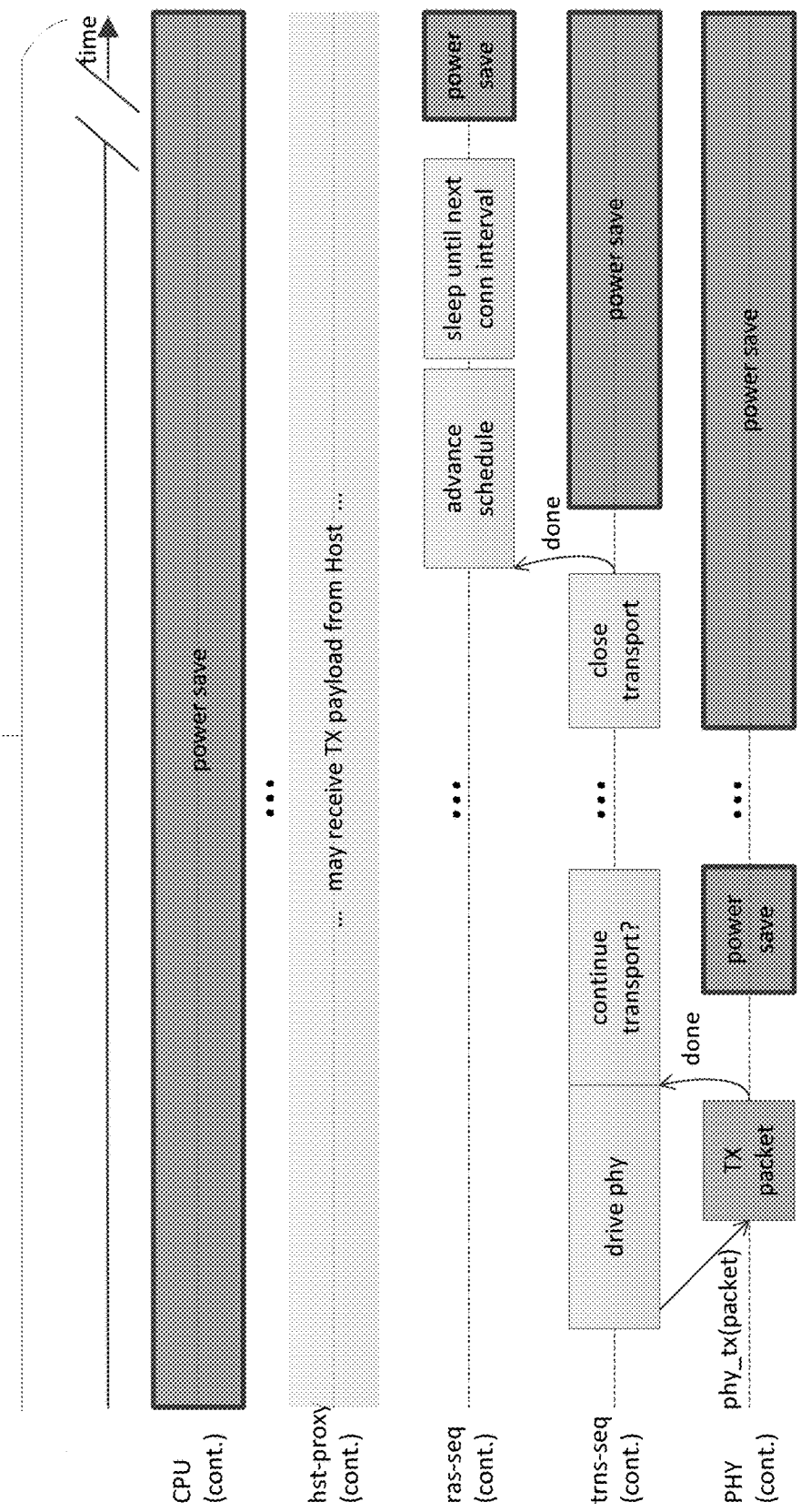

In FIGS. 3-2A and 3-3A, the arrows coming out of the "configure offloads" process are actually configuring the connection context 234-# (a process that should occur once before entering the steady-state). The transport sequencer 221, while being powered off, is not getting configured. In other words, the transport sequencer 221 does not need to be powered on for its context (state, configuration, and micro-controls) to be initialized, as the context will be stored elsewhere in a persistent memory.

Figure 4:
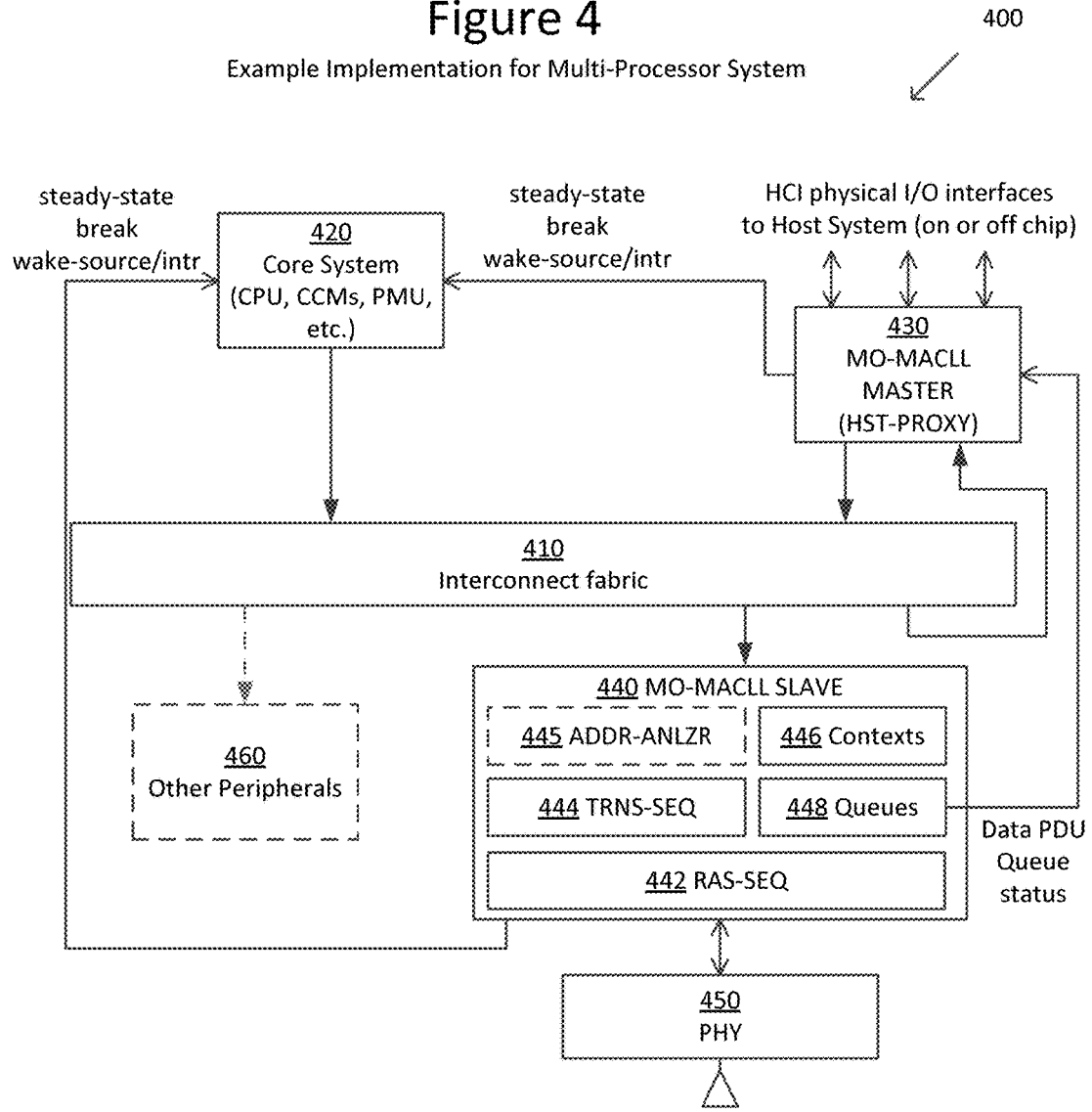
FIG. 4 illustrates a schematic diagram of an example implementation for Bluetooth Low Energy (BLE) of the MAC/LL architecture in a multi-processor System-on-Chip (SoC) in accordance with aspects of the disclosure.

FIG. 4 illustrates a schematic diagram of an example implementation for Bluetooth Low Energy (BLE) of the MO-MACLL architecture 200 in a multi-processor system 400 in accordance with aspects of the disclosure. Note that a host CPU, which handles upper layers of the protocol stack and/or the application, is assumed to exist in another hierarchy of the system, but it is not depicted in this figure.

The multi-processor system 400 comprises an interconnect fabric 410, a core system 420 (encapsulating a dedicated CPU), a MO-MACLL master 430 (correspond with the host proxy 212), a MO-MACLL slave 440, a PHY layer 450, and other peripherals 460. The MO-MACLL slave 440 comprises a radio access schedule sequencer 442 (correspond with 214) which is labeled RAS-SEQ, a transport sequencer 444 (correspond with 221) which is labeled TRNS-SEQ, an optional address analyzer 445 (correspond with 240) which is labeled ADDR-ANLZR, contexts 446 (correspond with 234-#), and queues 448 (correspond with 230-#, and 232-#).

The complete FIG. 4 may represent either a sub-system of a System-on-Chip (SoC) or a chip integrated into a full platform. In both cases the host CPU communicates with the MO-MACLL through the MO-MACLL master 430. The dedicated CPU 420 (e.g., small GPP or MCU) for the MAC/LL exists for the management tasks (non-steady-state operation), and during steady state operation the MO-MACLL 200 (composed by MO-MACLL master 430, and MO-MACLL slave 440) handles the MAC/LL functions as well as the host PDU exchange while the dedicated CPU 420 sleeps.

Figure 5:
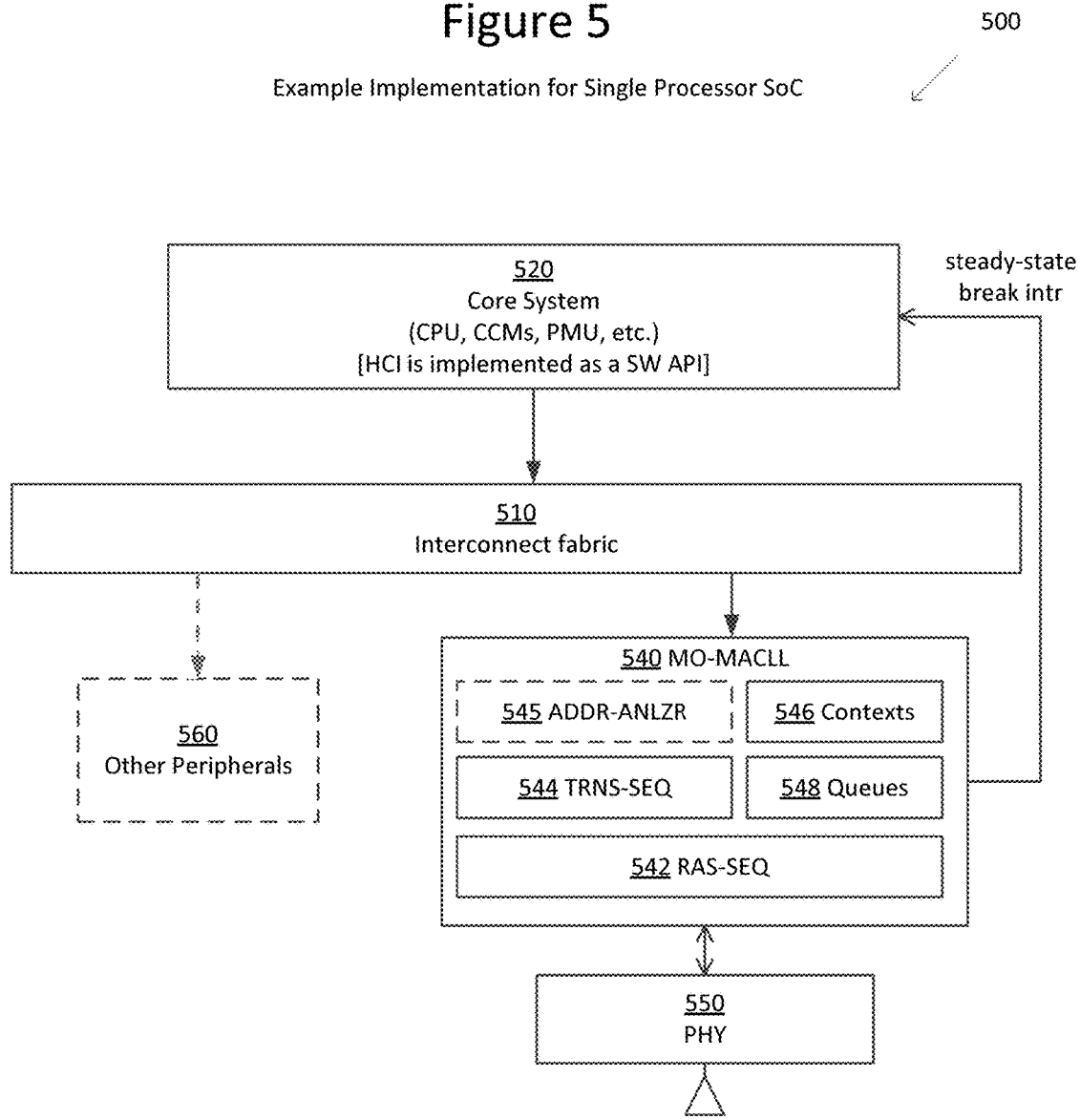
FIG. 5 illustrates a schematic diagram of an example implementation for Bluetooth Low Energy (BLE) of the MAC/LL architecture in a single-processor System-on-Chip (SoC) in accordance with aspects of the disclosure.

FIG. 5 illustrates a schematic diagram of an example implementation for Bluetooth Low Energy (BLE) of the MO-MACLL architecture 200 in a single-processor System-on-Chip (SoC) 500 in accordance with aspects of the disclosure.

The single-processor SoC 500 comprises an interconnect fabric 510, a core system 520 (encapsulating the CPU), a MO-MACLL 540, a PHY layer 550, and other peripherals 560. The MO-MACLL 540 comprises a radio access schedule sequencer 542 (correspond with 214) which is labeled RAS-SEQ, a transport sequencer 544 (correspond with 221) which is labeled TRNS-SEQ, an optional address analyzer 545 (correspond with 240) which is labeled ADDR-ANLZR, contexts 546 (correspond with 234-#), and queues 548 (correspond with 230-#, and 232-#).

FIG. 5 represents the complete SoC, where a single CPU 520 is used for host applications as well as MAC/LL functions. In this case the host proxy 212 offload (within AON-domain 210) is not required, as the HCI is implemented in a software Application Programming Interface (API). Still, while in steady-state operation, the MO-MACLL 540 handles the MAC/LL functions, and the CPU is offloaded and may sleep if the application does not require CPU cycles.

While it is known that hardware offloading mechanisms can be used to reduce power consumption during an idle-state of a MAC/LL protocol, the MO-MACLL architecture 200 enables CPU offloading during not only the protocol's idle-state, but also during the protocol's active-state. Therefore maximum CPU offloading, that is, minimum CPU wake time, during the complete steady-state operation of the device is possible, thus minimizing dynamic power consumption and, leakage power consumption (as a consequence of reduced memory footprint and CPU being powered down).

Simultaneously, the MO-MACLL architecture 200 is based on micro-controllable hardware offloads, to enable reconfiguration capabilities for different MAC/LL protocols, different versions of a protocol, or simply for Quality of Service (QoS) tuning in a single protocol.

II. Example Implementation of the Proposed Architecture for BLE Link Layer

The following subsections exemplify the above described concepts in the setting of a BLE Link Layer (BLE-LL) architecture. In the description that follows, BLE is used as an example, but this disclosure is not limited in this respect.

The BLE-LL mechanisms can be roughly partitioned in two groups: (1) upper BLE-LL mechanisms, which handle PDU-level control procedures, LL state machine state transitions, and baseband access scheduling for all the serviced logical transports by the device; and (2) lower BLE-LL mechanisms which handle all real-time concerns in the air interface protocol, i.e. wireless channel access sequencing, PDU de/packetization, and bit streaming in/out of the BLE PHY layer.

The MO-MACLL architecture 200, as discussed above, may completely offload the CPU intervention in lower BLE-LL execution, and handles the corresponding power sequencing of the BLE device, towards achieving larger continuous (uninterrupted) CPU sleep times during the steady-state. In the following, the term "LE-Event" refers generically to any of the following air interface protocol definitions: connection event, advertising event, or scan window.

Figure 6:
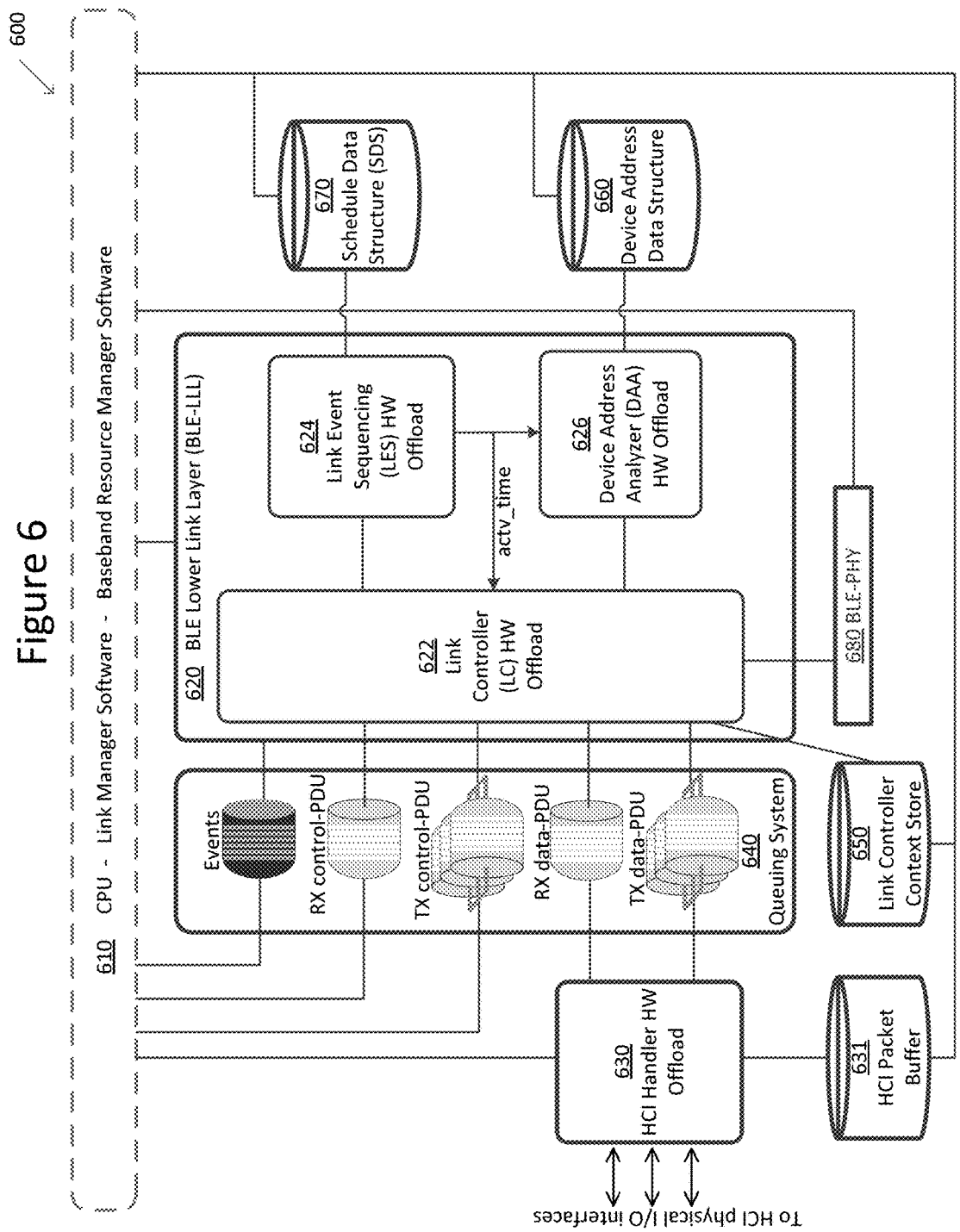
FIG. 6 illustrates a schematic diagram of an overview of a Maximally Offloaded BLE-Controller (MO-BLE-Controller) in accordance with aspects of the disclosure.

FIG. 6 illustrates a schematic diagram of an overview of a Maximally Offloaded BLE-Controller (MO-BLE-Controller) 600 (correspond with the MO-MACLL architecture 200) in accordance with aspects of the disclosure.

MO-BLE-Controller 600 comprises a CPU 610 which implements the Device Management, Link Management and the Baseband Resource Manager (BB-RM) policies in software, a BLE Lower Link Layer (BLE-LLL) hardware offload 620, an HCI Handler hardware offload 630, a queuing system 640, a link controller context store 650, a device address data structure 660, a schedule data structure 670, and a BLE physical layer 680. In the MO-BLE-Controller 600, the upper BLE-LL functionality is covered by the CPU 610 and the HCI Handler hardware offload 630. The BLE-LLL 620 comprises a Link Controller (LC) hardware offload 622, a Link Event Sequencing (LES) hardware offload 624 (which implements the BB-RM real-time mechanisms), and a Device Address Analyzer (DAA) hardware offload 626. The queuing system 640 comprises an event queue, a receive control PDU queue, a set of transmission control PDU queues (one per serviced logical transport), a receive data PDU queue, and a set of transmission data PDU queues (one per serviced logical transport).

The MO-BLE-Controller 600 offers multiple advantages. Overall, the MO-BLE-Controller enables eliminating all CPU 610 intervention in cases when all connections are in a steady-state, until something exceptional (non-steady-state) happens, so CPU 610 can be powered-down indefinitely while in steady state. Furthermore, the MO-BLE-Controller 600 offers also decoupled execution of software in the CPU 610 from the BLE-LLL hardware offload 620; software may be processing control PDUs that were previously received for one link, while the BLE-LLL is driving the air interface protocol for a different link. This decoupling is achieved as the control-plane operation of BLE-LLL 620 is driven by a persistent schedule data structure 670, while its data-plane is decoupled through a queuing system 640. Moreover, MO-BLE-Controller 600 enables a simplified software/firmware complexity for CPU 610, as real-time constraints have been offloaded to BLE-LLL 620. Ultimately, these simplifications lead to less software/firmware footprint, and less CPU dynamic power with maximum uninterrupted CPU power-saving periods.

Each of the following subsections describes a separate component of the MO-BLE-Controller 600, and specifies its mapping to the corresponding component of the MO-MA-CLL architecture 200.

A. Link Event Sequencing Hardware Offload

According to the core system architecture in the specification of the Bluetooth Low Energy System, the entity in charge of granting air interface access for the different serviced logical transports is the Baseband Resource Manager (BB-RM). The different logical transports that may be serviced are the LE asynchronous connection transport (LE-ACL) for each of the connected states (one per serviced connection), or the LE advertising broadcast (ADVB) transport for advertising, scanning or initiating states.

In the MO-BLE-Controller 600, the BB-RM is split between the CPU 610 and the Link Event Sequencing (LES) hardware offload 624. The CPU 610 (software) performs the ahead-of-time scheduling of LE-Events, while the LES hardware offload 624 performs the just-in-time sequencing of the software-defined schedule of LE-Events. This partitioning enables flexibility on the implemented scheduling policy in software, while the LES hardware circuit 624 offloads from the CPU 610 the BB-RM's just-in-time mechanisms for sequencing the LE-Events dispatching. Therefore, the LES hardware circuit 624 decouples the CPU 610 from the real-time requirements of LE-Event dispatching.

The main interface between the CPU 610, performing the BB-RM's ahead-of-time scheduling, and the LES hardware offload 624, performing the just-in-time sequencing of the software define schedule, is a persistent schedule data structure (SDS) 670. The SDS 670 contains one or more schedules, each of which is an ordered list of LE-Event descriptors (also referred to as LE-Event_Action). Each LE-Event descriptor in SDS 670 contains all the necessary information to recover the context for BLE-LLL 620 to resume the execution of the logical transport corresponding to the LE-Event described by the descriptor, and all the necessary information to dispatch the execution of the LE-Event at the right time to comply with air interface timing requirements. The SDS 670 decouples the execution of the CPU 610 from the execution of the BLE-LLL 620, allowing any of them to enter power saving mode independently while the decided schedule is maintained persistently in SDS. The CPU 610 produces the schedule data structure 670 while the LES hardware offload 624 consumes it for its sequencing. In certain cases, the LES hardware offload 624 may update schedule data structure 670.

The LES hardware offload 624 corresponds with the radio access schedule sequencer 214 and the PDU queue and context selector (multiplexer) 216 described above with respect to FIG. 2, while the schedule data structure (SDS) 670 corresponds with the radio access schedule 236 described above with respect to FIG. 2. In the following, LES hardware offload 624 will be referred to as LES 624.

While sequencing the software defined schedule of the SDS 670, the LES 624 is in charge of driving the power sequence (power gating, clock gating, setup sequences, etc.) for the rest of the BLE-Controller hardware (BLE-LLL 620 and BLE-PHY 680). The LES operation is based on a two-clock scheme, using an always-on low-power sleep clock as an absolute timing reference, and an active clock to drive execution within an LE-Event. By defining LE-Event timing in terms of an absolute reference (the sleep clock), the LES avoids accumulated error.

Next the timing concept for Base Band Resource Manager as implemented in the MO-BLE-Controller 600 will be described. The presented timing concept is used by both the CPU 610, while performing the ahead-of-time creation of the schedule, and by the LES 624, while performing the just-in-time sequencing of the schedule.

Figure 7:
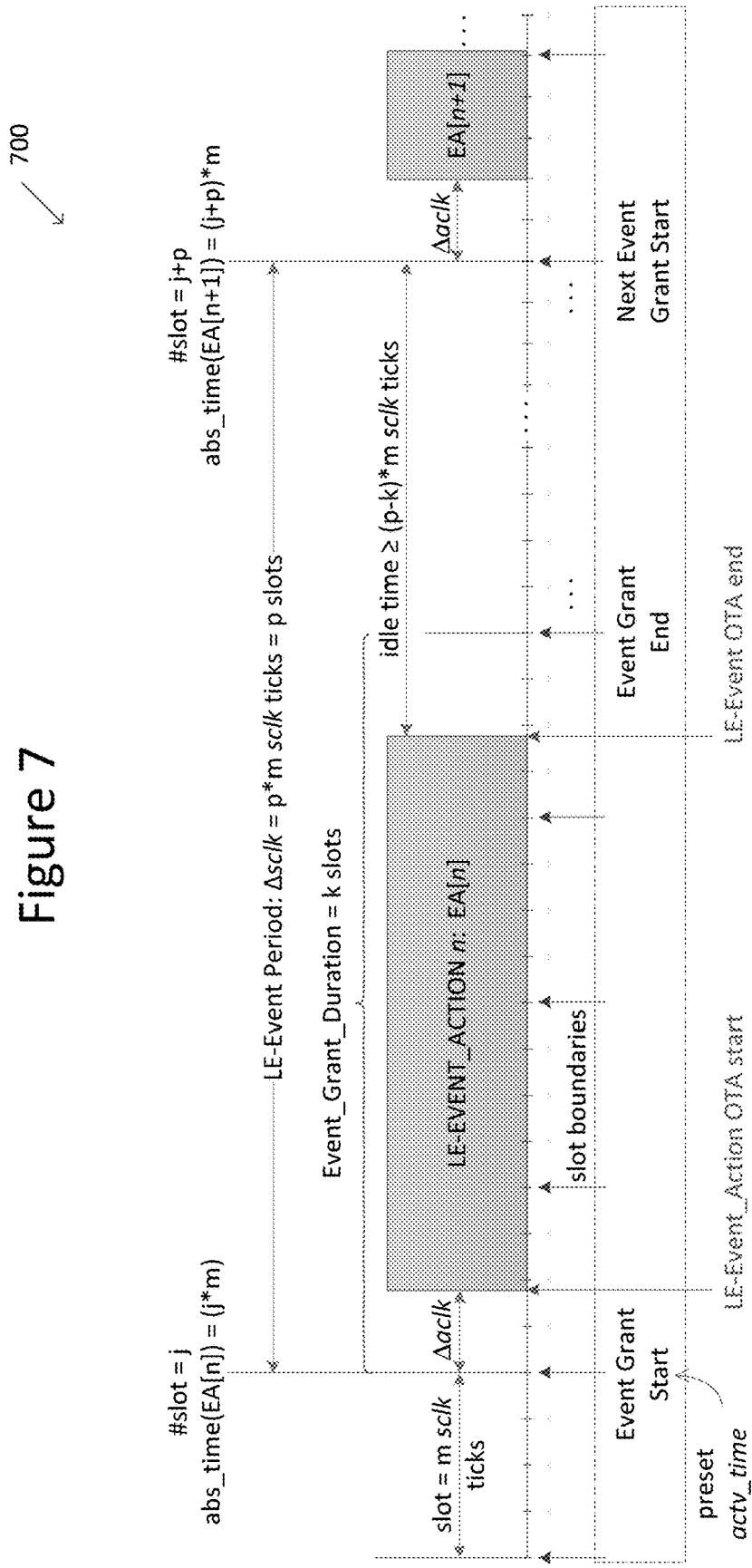
FIG. 7 illustrates a timeline of the Base Band Resource Manager (BB-RM) timing scheme.

FIG. 7 illustrates a timeline of the BB-RM timing scheme 700. The scheme is based on two clocks: a sleep clock, labeled sclk, and an active clock, labeled aclk.

The sleep clock (sclk) is a low-power, low frequency (while complying with the sleep clock accuracy required by the Specification of the Bluetooth System), always-on clock used to drive an absolute timing reference (abs_time).

The active clock (aclk) is a higher frequency clock (as required by the internal circuitry, while complying with the active clock accuracy required by the Specification of the Bluetooth System), used only during BLE-LLL 620 activity, used to drive a relative (within an LE-Event) timing reference, the actv_time. The actv_time is generated in the LES 624, and forwarded to the LC 622 and DAA 626 for intra LE-Event operations.

The BB-RM in the MO-BLE-Controller 600 uses the concept of slots as a minimum time allocation unit for scheduling purposes. A slot is defined as an integer number m of sclk ticks, therefore BB-RM scheduling is synchronous to the sleep clock. The BB-RM scheduling process comprises allocating an integer number of contiguous slots to different LE-Events corresponding to different logical transports, in a way that optimizes the Quality of Service (QoS) of each logical transport as required.

Each scheduled LE-Event is represented by an LE-Event_Action (also referred to as an LE-Event descriptor) within the SDS 670. An LE-Event_Action is granted a contiguous number of slots, referred to as Event_Grant_Duration, starting at a specific slot (labeled event grant start in FIG. 7) and ending Event_Grant_Duration slots later (labeled as event grant end in FIG. 7). The Event_Grant_Duration assigned to an LE-Event_Action represents the maximum amount of time that the LE-Event may elapse, but the LE-Event may not use the complete grant and terminate sooner due to multiple reasons, e.g. lack of user traffic to be communicated, explicit termination by a peer device, or for some exceptional reason such as multiple CRC errors. FIG. 7 shows two consecutive LE-Event_Actions, labeled EA[n] and EA[n+1] correspondingly.

Each LE-Event_Action specifies an Over-the-Air (OTA) start time for the corresponding LE-Event (labeled LE-Event OTA start in FIG. 7). The LE-Event_Action OTA start time may be different that the event grant start time, because grants are synchronous to the sclk and the sclk resolution may not be enough to capture the anchor point of LE-Events when the device is used with a peripheral role to multiple distinct central devices. For this reason, LE-Event_Action OTA start time is specified using dual-clock scheduling, i.e. sclk and aclk. The actv_time relative timing reference may be synchronized to sclk (preset to a predefined value, e.g. zero) on every LE-Event grant start time. Two different timing modes exist for LE-Event_Action OTA start time: absolute timing and relative timing.

Absolute timing is a mode useful for specifying non-recurring LE-Events. LE-Event OTA start time is specified with an absolute value of abs_time plus a delta number of aclk ticks: abs_time(EA[n])+Δaclk.

Relative timing is a mode useful for specifying periodically recurring LE-Events. LE-Event OTA start time is specified with a delta number of sclk ticks and another delta number of aclk ticks: Δsclk+Δaclk. Note that advertising events can be represented as periodically recurring LE-Events, by setting the periodically recurring OTA start time equal to advInterval and including the maximum advDelay as part of the Event_Grant_Duration.

From a synchronization point of view, the dual-clock scheduling scheme guarantees that synchronization errors (between sclk and aclk) are not carried forward or accumulated. Because sclk is used as an absolute reference, the scheduling is done in terms of the sclk with a only a fractional correction factor specified in terms of the aclk, and aclk gets resynchronized to sclk on each grant start time, then any synchronization error during LE-Event n (EA[n]) will not affect synchronization for LE-Event n+1 (EA[n+1]). Other schemes, which base all scheduling to the active clock (which is usually turned off during power saving mode), will suffer an accumulated error, as these schemes translate from active clock to sleep clock before going to power saving mode, and converting from sleep clock back to active clock after waking up.

The LES circuit 624 is a hardware offload which enables the CPU 610 to be decoupled from the just-in-time BB-RM operations while the device is in steady-state. Different BB-RM operation modes (to cover different usage scenarios) can be supported by the LES circuit 624, and each operation imposes different requirements on the CPU 610 BB-RM's ahead-of-time scheduling operation. The LES 624 may support these modes in a run-time configurable fashion (for multi role devices, e.g. Peripheral, Observer, Broadcaster and Central simultaneously devices), or it may support only one operation mode (for single role devices, e.g. Observer-only or Broadcaster-only devices). The four different operation modes supported by LES circuit 624 are: single static-periodic schedule sequencing mode, multiple static-single-event schedules arbitrated sequencing mode, single dynamic-aperiodic schedule sequencing mode, and mixed schedules arbitrated sequencing mode. Each operation mode will be described next.

Figure 10A:
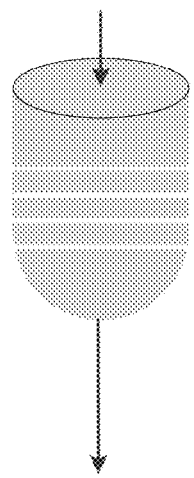
FIGS. 10A-C illustrate three different respective modes for a Schedule Data Structure (SDS) schedule.
Figure 10B:
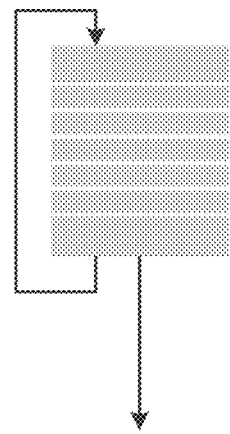

Single static-periodic schedule sequencing mode: This operation mode can be used without limitations to service multiple Central role (master) connections (i.e. without any other role being serviced simultaneously). Alternatively, this operation mode can also be used when a single Peripheral role (slave) connection, a single Broadcaster role logical transport, or a single Observer role logical transport is being serviced. In this operation mode, the CPU 610 performs the BB-RM's ahead-of-time scheduling for all the concurrently serviced logical transports once before entering steady-state (and must repeat the scheduling every time the device leaves and re-enters the steady-state). Each time the CPU 610 performs the BB-RM's ahead-of-time scheduling, it creates a single static periodic schedule for all the concurrently serviced logical transports, composed of multiple LE-Event_Actions; the schedule is said to be static as it won't change until the steady-state is broken. In this operation mode, the SDS 670 contains a single schedule for all the concurrently serviced logical transports. In this operation mode, the LES circuit 624 performs the BB-RM's just-in-time execution of the SDS 670 continuously, without removing any items from the SDS 670, by iterating over the LE-Event_Actions of the SDS 670 circularly and indefinitely. Because all serviced logical transports are scheduled in the same schedule by the CPU 610, then any software defined scheduling policy can be used to optimize QoS as needed (all conflicts resolved ahead-of-time). Therefore, this operation mode is the most power-efficient for long term steady-state scenarios, and enables the most efficient scheduling, as it allows the CPU 610 to perform scheduling once, and transition to low-power mode indefinitely (until the steady-state is broken), while the LES 624 dispatches the LE-Events for all the concurrently serviced logical transports just-in-time. The usage of the SDS 670 in this operation mode is shown in FIG. 10B (multiple Central role connections in a single schedule), or in FIG. 10C (single Central role connection in the schedule, single Peripheral role connection in the schedule, single Broadcaster role logical transport in the schedule, or single Observer role logical transport in the schedule).

Multiple static-single-event schedules arbitrated sequencing mode: This operation mode can be used to service any combination of roles (Observer, Broadcaster, Peripheral, and Central) but may not be as scalable as other modes, i.e. it may have a capacity limit to the number of simultaneously serviced logical transports. In this operation mode, the CPU 610 performs the BB-RM's ahead-of-time scheduling for each serviced logical transport separately, whenever the logical transport needs to be created or updated. Each time the CPU 610 performs the BB-RM's ahead-of-time scheduling, it creates or updates a schedule composed of a single static periodic LE-Event_Action corresponding with a specific serviced logical transport; the schedule is said to be static as it won't change until the steady-state is broken (i.e. when updating the logical transport configuration). In this operation mode, the SDS 670 contains multiple concurrently serviced schedules, each composed of a single LE-Event_Action. In this operation mode, the LES circuit 624 performs the BB-RM's just-in-time execution of the SDS 670 continuously, without removing any items from the SDS 670, by arbitrating over the single periodic LE-Event_Actions of each of the concurrently serviced schedules at run-time. For this operation mode, the LES circuit 624 needs to support at least one arbitration policy (but may support multiple different policies) to arbitrate between all the concurrently serviced scheduled, and the LES circuit may have configurations to allow the tuning of the arbitration policy (and the selection of the arbitration policy in case multiple are supported) to the BB-RM's needed. The CPU 610 may set the LES circuit 624 configuration at any given time the CPU is active (this will usually happen before entering steady-state). This operation mode is efficient for scenarios requiring multiple simultaneous Peripheral role connections, as CPU 610 is not required to modify the complete SDS 670 each time a new Peripheral role connection is created, and instead only a single schedule will need to be created or updated. Therefore, this operation mode is power-efficient for long term steady-state scenarios where multiple concurrent logical transports are being serviced where at least one of them of a Peripheral role, as once the steady-state is reached the CPU 610 is allowed to transition to low-power mode indefinitely (until steady-state is broken). The usage of the SDS 670 in this operation mode consists of a plurality of independent static-single-event schedules as the one shown in FIG. 10C, each schedule corresponding with a distinct serviced logical transport.

Single dynamic-aperiodic schedule sequencing mode: This is the most generic operation mode, as it can be used for any role, without a limit for the concurrently serviced logical transport count. In this operation mode a single dynamic schedule is used, the CPU 610 performs the BB-RM's ahead-of-time scheduling recurrently, each time adding more LE-Event_Actions to the single dynamic schedule being used, while the LES circuit 624 performs the BB-RM's just-in-time execution of the schedule continuously, removing from the schedule those LE-Event_Actions that have been already executed. In this operation mode the single schedule is dynamically changing (elements being added, and elements being removed from it). In this operation mode, the SDS 670 is composed of the single dynamic schedule. Therefore, this operation mode is the least power efficient, as it requires periodic intervention of the CPU 610, thus not allowing the CPU to enter low-power mode for large periods of time. This operation mode may be useful for logical transport that are transient (with a short limited life span), i.e. while advertising with the purpose of quickly creating a connection with Peripheral role, or while scanning/initiating with the purpose of quickly creating a connection with Central role. The usage of the SDS 670 in this operation mode is shown in FIG. 10A.

Figure 10C:
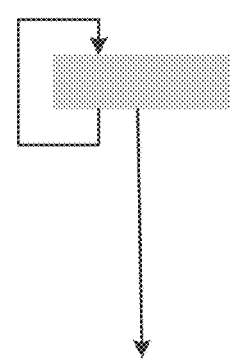

Mixed schedule arbitrated sequencing mode: A combination of the three previous operation modes, where the SDS 670 is composed of multiple schedules, and each schedule may be any of the allowed types: static-periodic (covering multiple logical transports), static-single-event (covering a single logical transport), or dynamic-aperiodic (covering one or multiple transient logical transports). This mode is an extension of the multiple static-single-event schedule arbitrated sequencing mode, as it requires the capability to track multiple schedules and arbitrate between them. The usage of SDS 670 in this operation mode consists of a plurality of independent schedules, of any type as shown in FIG. 10A, FIG. 10B, and FIG. 10C.

The LES circuit 624 includes two features to enable full CPU 610 offloading while either in single static-periodic schedule sequencing mode, or in multiple static-single-event schedule arbitrated sequencing mode: Automatic window widening and automatic advertising delay randomization. These two features are described next.

The Automatic Window Widening feature allows a logical transport for a connection with Peripheral role to enter a sustained steady-state. In other words, the LES circuit 624 handles timing adjustments without CPU 610 intervention during the life of the connection. This feature requires the LES circuit 624 to compute the window widening algorithm to obtain a correction factor on the OTA start time, and to update the LE-Event_Action inside SDS 670 corresponding to the currently serviced connection with Peripheral role.

The Automatic Advertising Delay Randomization feature allows a logical transport for a link in Advertising state to perform randomization of the advDelay parameter without CPU 610 intervention during the life span of the Advertising state. In other words, the LES circuit 624, after extracting the OTA start time for the LE-Event_Action descriptor, handles timing adjustments by computing a random delay and adding such delay to the OTA start time, in accordance to the Specification of the Bluetooth System.

The SDS 670 may hold multiple schedules. Every schedule is an ordered list of LE-Event_Action descriptors (EAD). Every EAD specifies at least the following information: an identifier of the link context being serviced, an absolute or relative timing mode, an OTA start time specification (format according to timing mode), a total granted time (in slots) for the LE-Event, and a number of missed connection intervals since last scheduled grant for this context identification (central or peripheral roles only). The EAD may indicate if automatic window widening is enabled (peripheral role only), or if automatic randomization of advertising delay is enabled (advertising event only).

FIG. 10A illustrates a dynamic-aperiodic schedule. The CPU 610 dynamically schedules the different logical transports by continuously adding new EADs to the tail of the queue, while the LES continuously reads and removes EADs from the head of the queue. EADs may use either timing mode. This schedule mode can be efficiently implemented in shared memory.

FIG. 10B illustrates a static-periodic schedule. The CPU 610 statically schedules all serviced logical transports in a periodic schedule, which is implemented as a circular list of EADs, all with relative timing mode, while the LES continuously reads them circularly (without removing them). This is most efficient for multiple link contexts, all with central-role, when all have achieved steady-state, as the same schedule can be used unchanged for a long period of time. This scheme can be also used for peripheral roles at the expense of granting more time to every LE-Event than actually required, in order to enable automatic window widening. This schedule mode can be efficiently implemented in shared memory.

FIG. 10C illustrates a static single-event schedule. The CPU 610 schedules a single EAD for a single logical transport, with relative timing mode, which cycles to itself. LES continuously executes this single EAD. This scheme is useful for a single logical transport for any role (broadcaster, scanner, peripheral or central). This schedule mode can be efficiently implemented either in shared memory, or with a small amount of persistent registers.

Figure 8:
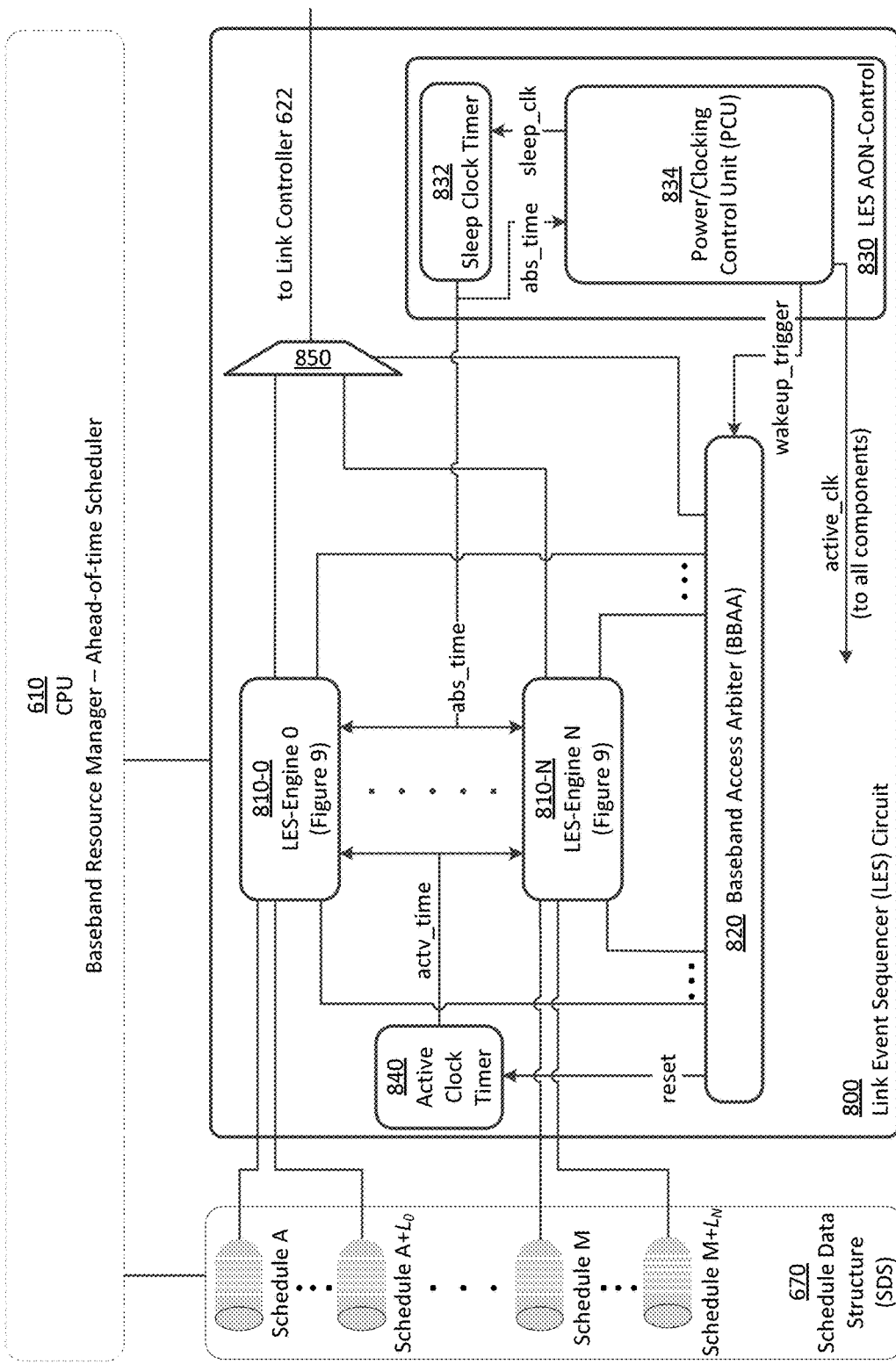
FIG. 8 is a schematic diagram of a generic Link Event Sequencing (LES) circuit and a Schedule Data Structure (SDS).

FIG. 8 is a schematic diagram of a generic LES circuit 800, which interacts with the CPU 610 (BB-RM ahead-of-time scheduling), the SDS 670, and the LC 622. The LES circuit 800 corresponds with LES hardware offload 624.

The LES circuit 800 comprises one or more LES-Engines 810 (when multiple exist, they are labeled from 810-0 to 810-N), a Baseband Access Arbiter (BBAA) 820, a LES AON-Control 830, an active clock timer 840, and a multiplexer 850. The LES AON-Control 830 comprises a sleep clock timer 832 and a power/clocking control unit (PCU) 834.

Figure 9:
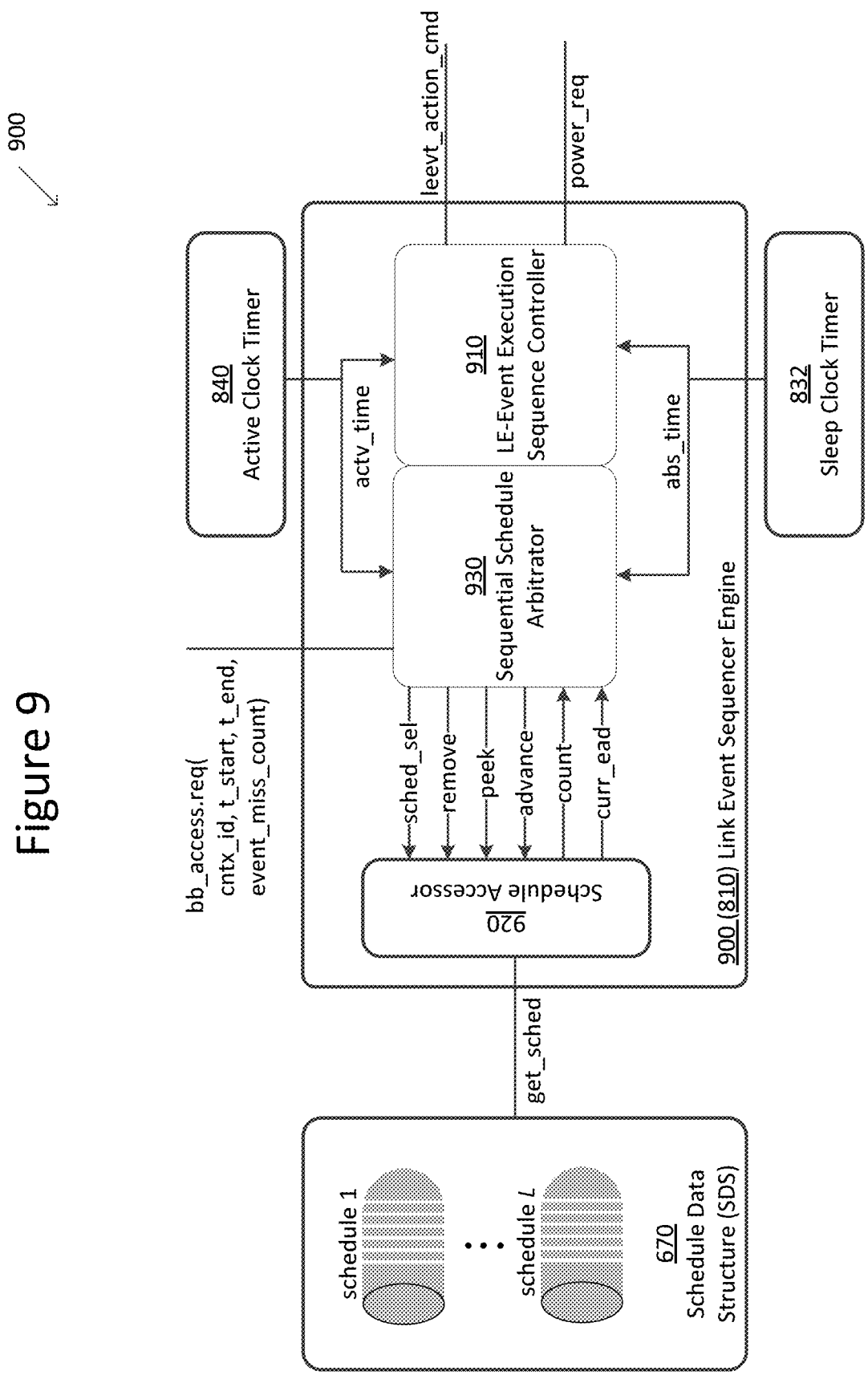
FIG. 9 is a schematic diagram of the LES-Engine.

FIG. 9 is a schematic diagram of a LES-Engine 810 of FIG. 8. The LES-Engine 810/900 comprises a sequential schedule arbitrator 930, an LE-Event execution sequence controller 910, and a schedule accessor 920.

The LES circuit 800 may result in multiple different specializations. Any LES specialization may include one or more LES-Engines 810-# (where # represents the LES-Engine identifier, i.e. 810-0 to 810-N). Any LES specialization may assign to each LES-Engine 810-# a separate set of one or more schedules within the SDS 670.

In a LES circuit 800 specialization, when multiple LES-Engines 810-# exist, the BBA 820 is included to arbitrate between all the LES-Engines 810-# in parallel. The BBA 820 may be configured by the CPU 610 to select the desired arbitration policy and to tune such policy to the current QoS requirements.

In a LES circuit 800 specialization, when a single LES-Engine 810/900 is coupled to more than one schedule within the SDS 670, the sequential schedule arbitrator 930 is included inside the LES-Engine to arbitrate between all the coupled schedules in a sequential manner, i.e. the sequential schedule arbitrator 930 will access the current EAD on each schedule sequentially, before arbitrating (if a conflict arises) and deciding which schedule to service next. The sequential schedule arbitrator 930 may be configured by the CPU 610 to select the desired arbitration policy and to tune such policy to the current QoS requirements.

Figure 11:
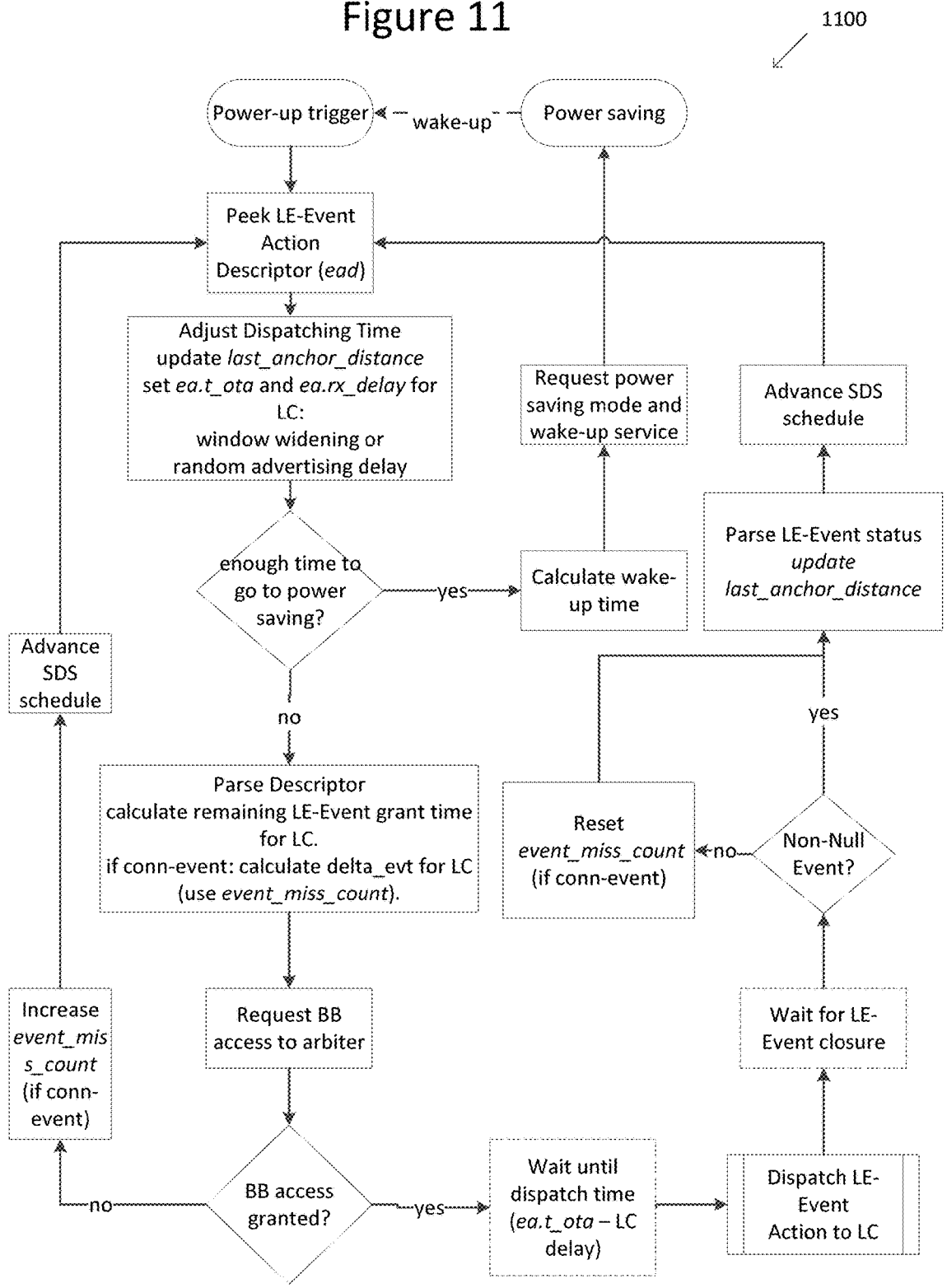
FIG. 11 illustrates a flowchart of a control sequence of the Link Event Execution Sequence Controller.
Figure 12:
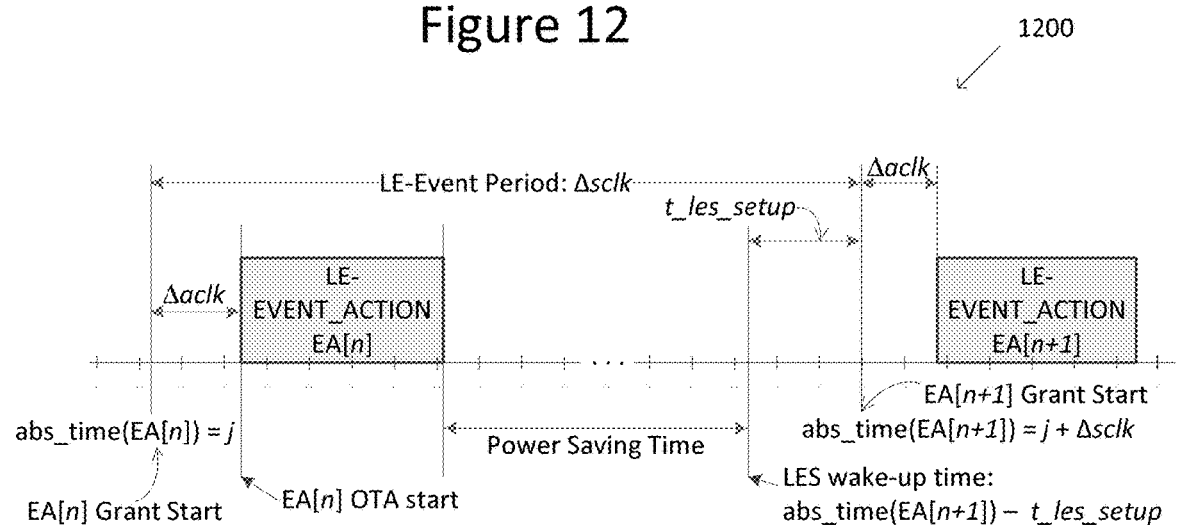
FIG. 12 illustrates a timing diagram of the LES-Engine power saving and wake-up.

FIG. 11 illustrates a flowchart 1100 of a control sequence of the Link Event Execution Sequence Controller 910. FIG. 12 illustrates a timing diagram 1200 of the LES-Engine power saving and wake-up.

The LES-Engine 810/900 is a core component of the LES 624 which interprets the SDS 670 schedules and executes them accordingly, while performing the power sequencing of the device to guarantee maximal power savings during wireless idle periods. The arbitration between multiple SDS 670 schedules inside the LES-Engine 810/900 is handled by the sequential schedule arbitrator 930. The main control machine in LES-Engine 810/900 is the Link Event Execution Sequence Controller 910.

After being triggered for execution, the LES-Engine 810/900 reads the current EAD from SDS 670 (current EAD after arbitration, in the case of multiple schedules assigned to the same LES-Engine), parses it and updates the LE-Event start time if required, if requested to do automatic window widening or automatic advertising delay randomization. With the updated LE-Event OTA start time, the LES-Engine 810/900 requests baseband access to the BBAA 820, and if not granted, it updates an internal counter (event_miss_count) that keeps track of the number of consecutive baseband access rejections, drops the current EAD and advances the SDS 670 to get the next EAD. If baseband access was granted, depending on the amount of time remaining until the current LE-Event start time, LES-Engine 810 determines if there is enough time to go to a power saving mode (and which mode), calculates the wake-up time, and requests the power mode transition and a wake-up service to the PCU 834, without updating the state of the SDS 670, as shown in FIG. 12. When the LES-Engine 810/900 is woken-up, it fetches the same EAD and continues its execution by preparing the EA command for the LC 622, and dispatching the command to the LC 622. The LE-Engine 810/900 waits until the LC 610 completes the EA execution. After the LC 610 finishes, LE-Engine 810/900 parses the LE-Event completion status to update internal counters, if needed, depending on LE-Event type, and advances the SDS 670 to get the next EAD, and the previously described process starts again.

The LES-Engine 810/900 access the SDS 670 schedules through the get_sched interface, which offers the following services: 1) curr_EAD←peek( ), which returns the EAD at the currently pointed location in the list; 2) advance( ), which advances the pointed location in the list to the next location without removing the currently pointed location from the list; 3) count←remove( ), which advances the pointed location in the list and removes the currently pointed location from the list, while also updates and returns the valid EAD count in the schedule; and 4) schd_sel( ), which selects which schedule is being addresses within the SDS 670 and returns the valid EAD count for such schedule.

When the SDS 670 schedule is in dynamic-aperiodic mode, every time the LES-Engine 810/900 executes an EAD, it must remove it from the schedule, therefore the remove( ) service is used. On the contrary, when SDS 670 schedule is in a circular mode the LES-Engine 810/900 shall never remove elements from the SDS 670 schedule to continue reading them circularly, therefore the advance( ) service is used. In order to abstract the Link Event Execution Sequence Controller 910 from the SDS 670 mechanisms, the Schedule Accessor 920 in the LES-Engine 810/900 encapsulates all the mechanisms to access the SDS in all the possible modes, and it must be configured by CPU 610 to operate on the correct mode.

The LES-Engine 810/900 requests baseband access through the bb_access interface, which offers a single service: success←req(cntxt_id, t_start, t_end, event_miss_count), which requests baseband access for logical transport with context cntxt_id, starting at time slot t_start, ending at time slot t_end, and providing the event_miss_count value for the arbiter. The return value success indicates if the baseband access was granted or not.

The BBAA 820 is only required when more than one LES-Engine 810/900 is used inside the LES 624. The purpose of this arbiter is to arbitrate between contending LES-Engines requesting BB access simultaneously. LES-Engines 810/900 request BB 610 access to the BBAA 820 through their corresponding bb_access interface. Every LES-Engine 810/900 should at all times, while not in power saving mode, request 610 BB access for its next upcoming LE-Event. BBAA 820 may offer several different arbitration policies, and select one based on configuration. Some example policies are: priority/weighted based servicing, closest to timeout based servicing, and highest event_miss_count first based servicing.

The BBAA 820 also knows the connSlaveLatency of each LES-Engine 810/900 servicing a Peripheral-role logical transport. This information may be taken into account during arbitration.

The BBAA 820 muxes the interfaces to the LC 622 between all the LES-Engines 810/900, to allow only the granted LES-Engine 810/900 to use the LC 622. Furthermore, the BBAA 820 receives all the power requests of all the LES-Engines 810/900, and it decides which final power request to forward to the PCU 834, based on arbitration results.

The PCU 834 serves as a slave to the Baseband Access Arbiter (BBAA) 820 by handling the power state control sequences for the BLE-Controller 600 hardware (LL hardware offloads and BLE-PHY 680), the generation of the active clock (aclk), and the distribution of the sleep clock (sclk). PCU operates on sclk while the system is in power saving mode, and operates on aclk while the system is active. Moreover, this module provides wake-up service for rest of the LES 624. The BBAA 820 requests services from the PCU 834 through the power_req interface, which provides two services which are described next: wakeup and set power state.

The wakeup service: wakeup(down_time, trgt_pwrst, rtrn_pwrst). This service puts the system in power saving state "trgt_pwrst", turns off aclk generation, wait the specified period of time "down_time", brings the system up to the specified active power state "rtrn_pwrst", turns on aclk generation, sets up the system (this may include resets), and signals a wakeup_trigger to trigger execution resume for LES.

The set power state service: set_pwrst(trgt_pwrst). This service forces the transition of the system to the requested power state "trgt_pwrst".

The sleep clock timer 832 and the active clock timer 840 are simple counters that provide time references abs_time/actv_time with sclk/aclk resolution respectively. The sleep clock timer 832 never stops counting, while the active clock timer is turned off during power saving modes, and may be reset by the BBAA 820.

B. HCI Data-Flow Control Hardware Offload

Figure 13:
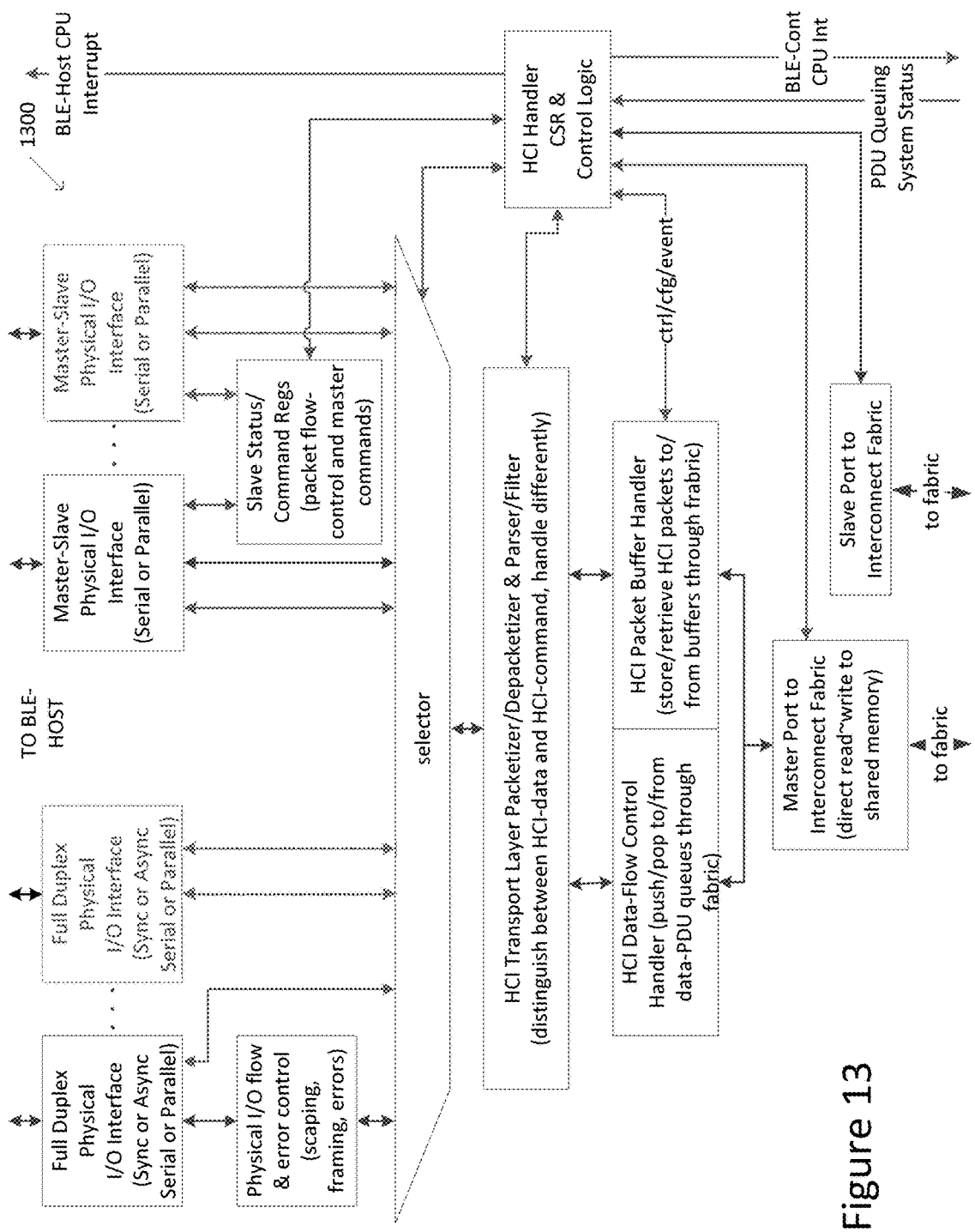
FIG. 13 is a schematic diagram of an HCI Handler Offload.

A schematic diagram 1300 of the HCI Handler hardware offload 630 is illustrated in FIG. 13. It is assumed that a small low-power CPU 610 is used for the BLE-Controller firmware only. Thus, the BLE-host firmware is handled elsewhere, ideally in the same processor core that handles the device's application, as their execution times are coupled. The HCI handler hardware offload 630 belongs to the upper BLE-LL (alongside the CPU 610).

The HCI handler 624 corresponds with the host proxy 212 in FIG. 2. In the following, the HCI Handler hardware offload 630 will be referred to as the HCI handler 630 for brevity.

An HCI handler 630 offers three offloading levels of the HCI procedures from the CPU 610: (1) a physical Input/Output (I/O) protocol data-unit level; (2) an HCI transport level; and (3) an HCI full data flow-control level. Different implementations of the HCI handler 630 may include offloading level (1) only, offloading levels (1) and (2), of all three offloading levels.

The MO-BLE-Controller 600 assumes two types of persistent data structures to decouple it from the CPU 610 and the BLE-LLL 620. In the control-plane perspective, there is an HCI packet buffer 631 in which to store HCI packets to be produced/consumed by the CPU 610. In the data-plane perspective, there is a transmit/receive data PDU queueing system 640, through which incoming/outgoing BLE data PDUs are exchanged from/to the BLE-LLL 620.

The control-plane HCI packet buffer 631 is used to decouple the CPU 610 from the HCI handler 630, and may store any type of HCI packet (command, event or data). The state of the HCI packet buffer is maintained by the BLE-Controller CPU 610.

The data-plane PDU queuing system 640 is located between the BLE-LLL 620 and the HCI handler 630, and allow a PDU exchange decoupled from the air interface protocol timing. Furthermore, the PDU queuing system 640 has separate queues for control-PDU (produced or consumed by BLE-Controller CPU 610) and data-PDU (received or relayed from/to BLE-Host by the HCI Handler 630), which decouples the protocol control and data flows. The PDU queues may be implemented as dynamically allocated multi-queues in shared memory for efficiency and consistency.

In the transmit direction, multi-queues are needed (both for control-PDU or data-PDU) to separate traffic for distinct peer-to-peer logical transports, that is, different connections, and avoid the head-of-the-line blocking problem. In the receive direction only a single data-PDU queue and a single control-PDU queue are needed, as both the BLE-Controller CPU 610, and BLE-Host (through the HCI Handler 630) are able to process packets in an arrival-order basis. The state of the PDU queuing system 640 is maintained by a hardware offload internal to the queuing system to decouple the execution times of the lower and upper BLE-LL sides.

In the MO-BLE-Controller 600, the HCI handler 630 is in charge of pushing transmit PDUs (received from BLE-Host) into the corresponding TX data-PDU queue 640 (one queue per serviced LE-ACL logical transport), pulling received PDUs out of the RX data-PDU queue 640 (and relaying them to the BLE-Host), and storing/retrieving HCI command/event packets into/from the HCI packet buffer (for relaying them to CPU 610/BLE-Host), all without CPU 610 intervention.

When the HCI handler 630 implements all the three offloading levels, these may be implemented in a runtime configurable fashion to accommodate varying system needs at runtime. In such runtime configurable cases, the HCI handle 630 operation mode (offloading level) is chosen at runtime through register configurations. In all operation modes, the "HCI Handler CSR & Control Logic", as shown in FIG. 13, takes care of sequencing the operation, as described below. In all operation modes, all the configurable aspects of the HCI handler 630 are encapsulated in the control and status registers (CSR) inside the "HCI Handler CSR & Control Logic" block, as shown in FIG. 13.

The HCI handler's 630 first offloading level takes care of physical data unit transfer of raw data between BLE-Host and BLE-Controller 600, for example, bytes or words, following a specific flow control protocol for each data unit. This offloading is implemented by one or more physical I/O interfaces (e.g. SPI, UART, AHB, etc.) to the BLE-Host, as needed for flexibility, each requiring its own hardware interface to follow the specific I/O protocol. Physical I/O interfaces might be synchronous/asynchronous, serial/parallel and master-slave/full-duplex depending on the requirements for the system design (e.g., UART, 3-wire UART, SDIO, AHB, asynchronous parallel ports, custom I/O protocol, etc.). Some physical I/O interfaces may require dedicated lines while others do not, that is, master-slave interfaces will require BLE-Host CPU interrupt lines.

The HCI handler 630 first offloading level decouples the CPU 610 operation from the data unit transfer through the I/O protocol. When operating at this offloading level, every correctly transmitted/received physical data unit will cause a BLE-Controller CPU Interrupt, and the CPU 610 will be in charge of transferring data units between the shared memory and the HCI handler 630. This offloading is handled by the physical I/O interface hardware blocks (top line of boxes in FIG. 13).

The HCI handler 630 second offloading level takes care of packet-level transport flow/error-control through the physical I/O interface. The full transport of packets (group of PDUs) may require extra flow-control and error detection (retransmission handling, synchronization loss detection, etc.) over the physical I/O interface. This functionality requires an extra level of packet framing when transferring packets to BLE-Host as some physical data units carry transport information as HCI packet size, i.e. not HCI payload, and the corresponding parsing when receiving packets from BLE-Host.

This second offloading level is based on the hardware blocks "Physical I/O flow & error control", "Slave Status/Command Regs", "HCI Transport Layer Packetizer/Depacketizer & Parser/Filter", and "HCI Packet Buffer Handler" in FIG. 13, which take care of: (1) handling flow and error control of data unit transfers over the physical I/O; (2) framing/deframing HCI data units into/from HCI transport packets when sending/receiving to/from the BLE-Host; (3) packetizing/depacketizing HCI payload (data, command, event) into/from HCI transport packet when sending/receiving from BLE-Host; (4) loading/storing outgoing/incoming HCI payload from/into the generic HCI packet buffer in shared memory; (5) signaling event for BLE-Controller CPU 610 when completing an HCI packet send/receive operation.

This second level of offloading can take care of the packet-level transport flow/error control in full duplex physical I/O interfaces by including an extra hardware block called "physical I/O flow and error controller" (see FIG. 13) on top of the physical I/O interface, e.g. for packets in 3-wire UART transport. This level of offload can enable packet level flow control on master-slave physical I/O interfaces by including an extra hardware block called "Slave status/command registers" (see FIG. 13), which maintains the packet flow-control status (on registers mapped to the I/O interface address space, or mapped to GPIOs accessible to the BLE-Host) for master-slave physical I/O interfaces which allows the BLE-Host master to query the status and perform reads/writes as needed, e.g. for SPI transport.

When operating at the second offloading level, the BLE-Controller CPU 610 must configure the HCI packet buffer slot to be used for every HCI transport packet to be sent/ received. After every correctly sent/received HCI transport packet (from/into the generic HCI packet buffer) will cause a BLE-Controller CPU Interrupt, and the CPU 610 will be in charge of providing another HCI packet to be sent, or analyzing the received HCI packet and acting on it as required (i.e. forwarding a data-PDU to the PDU queuing system, or consuming a command packet).

The HCI handler 630 third offloading level takes care of HCI packet parsing and filtering and automatic HCI data flow-control. The full data flow-control of HCI data packets builds on top of the previous offloading level by differentiating between incoming (from BLE-Host) and outgoing (to BLE-Host) HCI transport packets produced/consumed by either the BLE-Controller CPU 610 or the BLE-LLL 620. The HCI packets consumed/produced by the CPU 610 are stored/loaded to/from the generic HCI packet buffer, while the HCI packets consumed/produced by the BLE-LLL packets are stored/loaded to/from the PDU queuing system 640.

This offloading level requires an extension to the "HCI Transport Layer Packetizer/Depacketizer & Parser/Filter" hardware block in order to further parse the HCI packet and extract the packet type, packet length, etc. The HCI event and command packets are produced/consumed by CPU 610, while HCI RX/TX data packets are produced/consumed by the BLE-LLL 620. A further addition for this offloading level is the hardware block "HCI Data-Flow Control Handler" (see FIG. 13), which jointly handles the data-flow into/out-of the PDU queuing system, and the credit-based flow control with the BLE-Host (automatic HCI event packet generation for data flow control).

For this offloading level, a dedicated sideband signal carrying the status of the PDU queuing system 640 (full/empty/credit-count) may be added to avoid querying the queuing system through the fabric. This sideband signal is shown as "PDU Queuing System Status" in FIG. 13.

When operating at this offloading level, control-plane and data-plane operate in a decoupled fashion as described next.

From the control-plane perspective, the CPU 610 must configure the HCI packet buffer slot to be used for the HCI event packets to be sent (except for data flow-control credit events) and for the HCI command packets to be received. After every correctly sent/received HCI event/command packet (from/into the generic HCI packet buffer), the HCI handler 630 will generate an interrupt to the CPU 610, and the CPU 610 will be in charge providing another HCI event packet to be sent, or analyzing the received HCI command packet.

From the data-plane perspective, the HCI handler offload 630 will automatically exchange transmit/receive data-PDUs between the BLE-Host and PDU queuing system 640, (and generate data-flow credit HCI event packets automatically) completely decoupled from the BLE-LLL 620 operation, and completely decoupled from CPU 610 operation.

Ultimately, during the steady-state of a connection, when only HCI data packets are expected, the BLE-Controller CPU 610 will not be interrupted to handle HCI interactions.

C. Link Controller Hardware Offload

A Link Controller (LC) hardware circuit 622 offloads all real-time mechanisms of the lower BLE-LL (BLE-LLL 620) air interface protocol from the CPU 610. The LC offload 622 completely abstracts the CPU 610 from intra LE-Event operations.

The LC circuit 622 is used as an LE-Event processing accelerator shared/reused between all the active contexts (established connection contexts, advertising context, scanning context, initiating context) of the concurrently serviced links or logical transports in the device. Context refers to the set of state and configuration registers which allow repurposing the LC 622 for different links.

The LC 622 is driven through LE-Event action commands which request the processing of a specific type of LE-Event, for a specific link context, at a specific starting time. On execution of an LE-Event command, the LC 622 will handle the following tasks: automatic context switching (save old context, load new context), sequencing all packet operations (receive/transmit/wait), at the correct time, inside any LE-Event, performing data-plane processing for every packet, performing packet flow control and handling reliability for links in connected state, and performing BLE-PHY sequencing for every packet (drive power sequencing and configuration sequencing).

Figure 14:
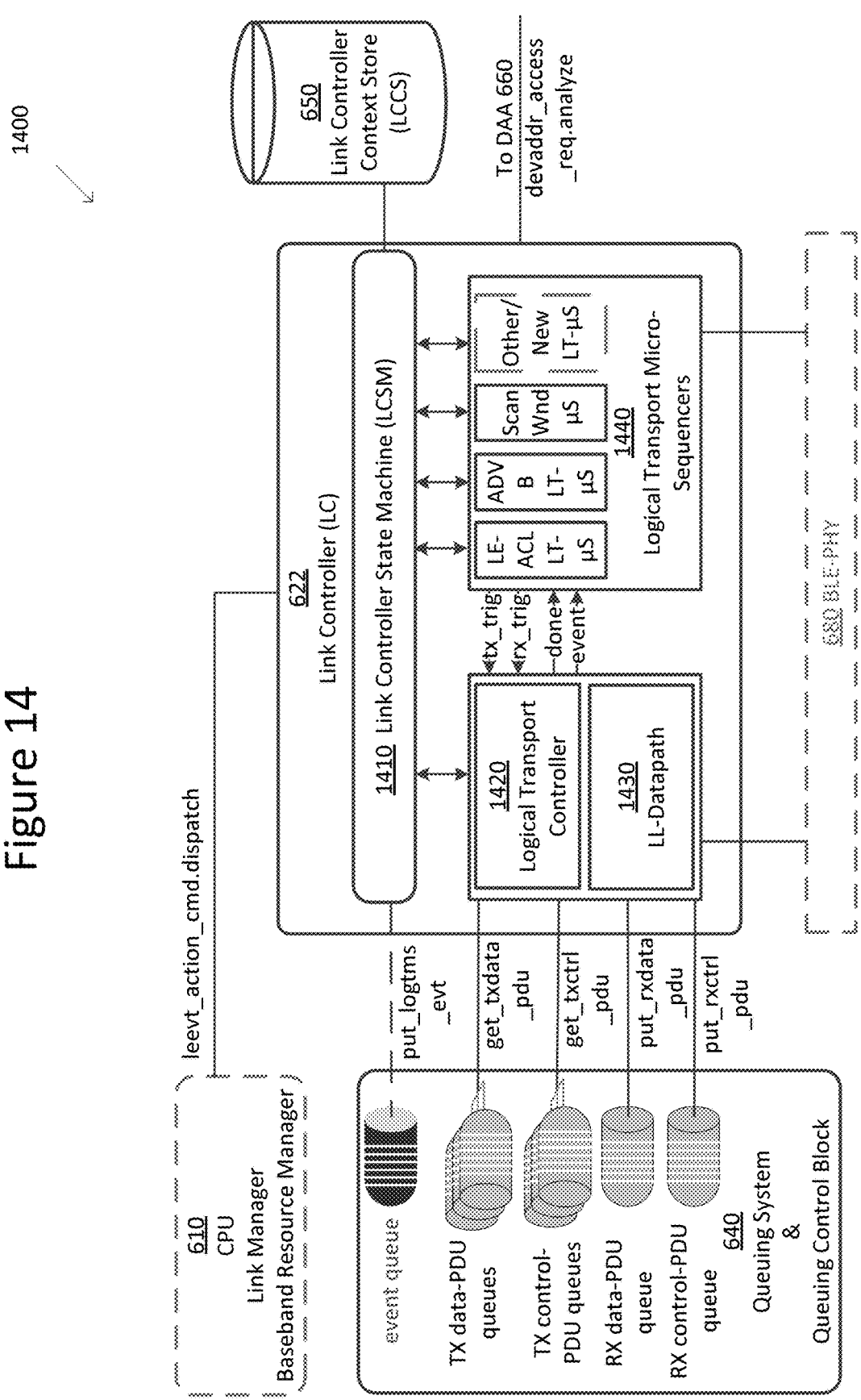
FIG. 14 illustrates a schematic diagram of a link controller hardware circuit.

FIG. 14 illustrates a schematic diagram 1400 of a LC hardware circuit 622, which interacts with the CPU 610, queuing system 640, Link Controller Context Store (LCCS) 650, and BLE-PHY 680.

The LC 622 corresponds with the transport sequencer 221 in FIG. 2, and the LCCS 650 corresponds to the plurality of connection contexts 234-# in FIG. 2.

Figure 15:
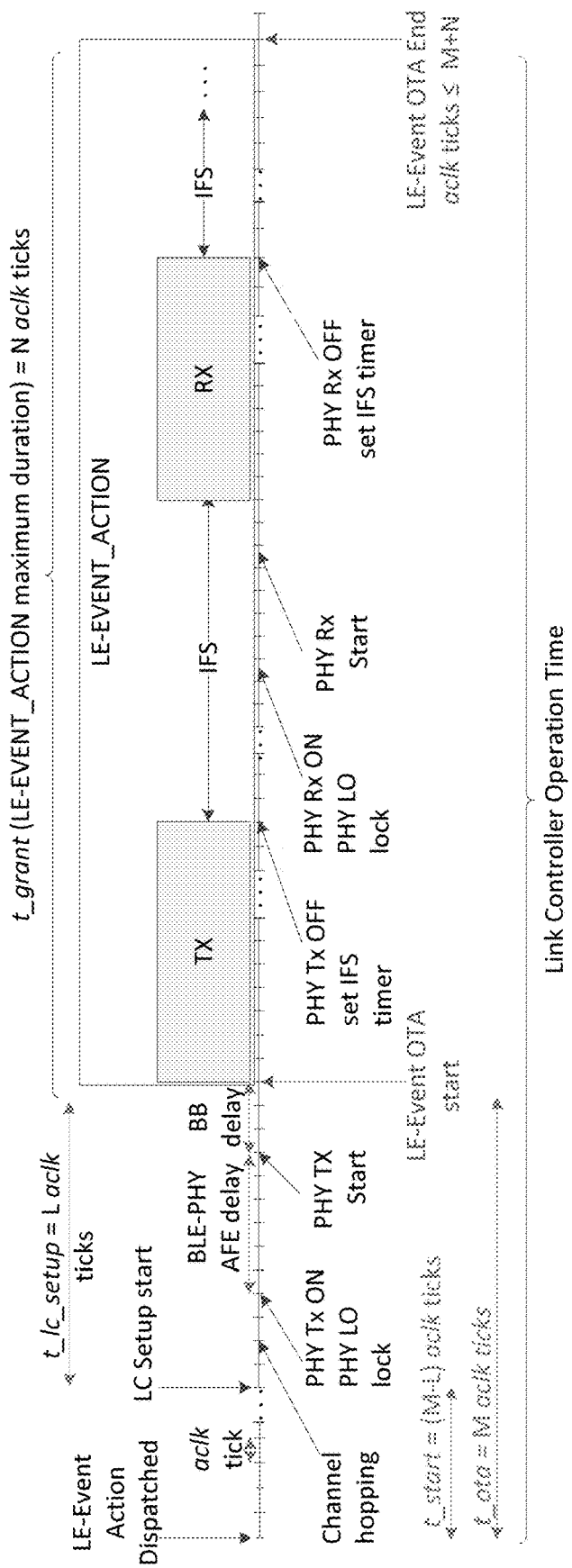
FIG. 15 illustrates a timing diagram of a link controller LE-Event Action Sequencing.

FIG. 15 illustrates a timing diagram 1500 of the intra LE-Event operation performed by the LC, i.e. the sequencing of an LE-Event_Action.

The LC 622 handles the transport of PDUs with peer device, over the air, within an LE-Event, that is, drives the execution of lower-granularity scheduling of intra LE-Event operation sequencing (transmit, receive, wait, and setup/setdown of BLE-PHY) for each of the logical transports serviced in the device. In this context, the LC 622 execution of an LE-Event up to completion is called an LE-Event_Action (EA). LC 622 uses the active clock (aclk) for all hard real-time operations.

LC 622 is composed of four main components: a Link Controller State Machine (LCSS) 1410, a Logical Transport Micro-Sequencers 1449, a Logical Transport Controller 1420 and a LL-Datapath 1430, as shown in FIG. 14.

The LCSM 1410 provides the required low-level control of LC 622 to initialize execution of an LE-Event for a specific serviced logical transport at a specific time and during a specific granted time span. The LCSM 1410 presents the leevt_action_cmd interface to accept dispatched EAs. The EAs are dispatched either by the LES 624 (during steady-state operation) or by the CPU 610 (during non-steady-state operation). EAs are dispatched through the service: status←dispatch(cntxt_id, delta_evt, t_ota, t_grant, rx_delay), where cntxt_id is the identifier for the context to be serviced; delta_evt is the number of missed LE-Events since last execution of this context; t_ota is the over-the-air starting time of this LE-Event; t_grant is the maximum granted duration of the LE-Event; and rx_delay is the maximum scan delay for the first received packet in the LE-Event (adjustable parameter for window widening and connection establishment), while status indicates completion condition of the LE-Event action, and returns LE-Event information depending on the LE-Event type.

Figure 16:
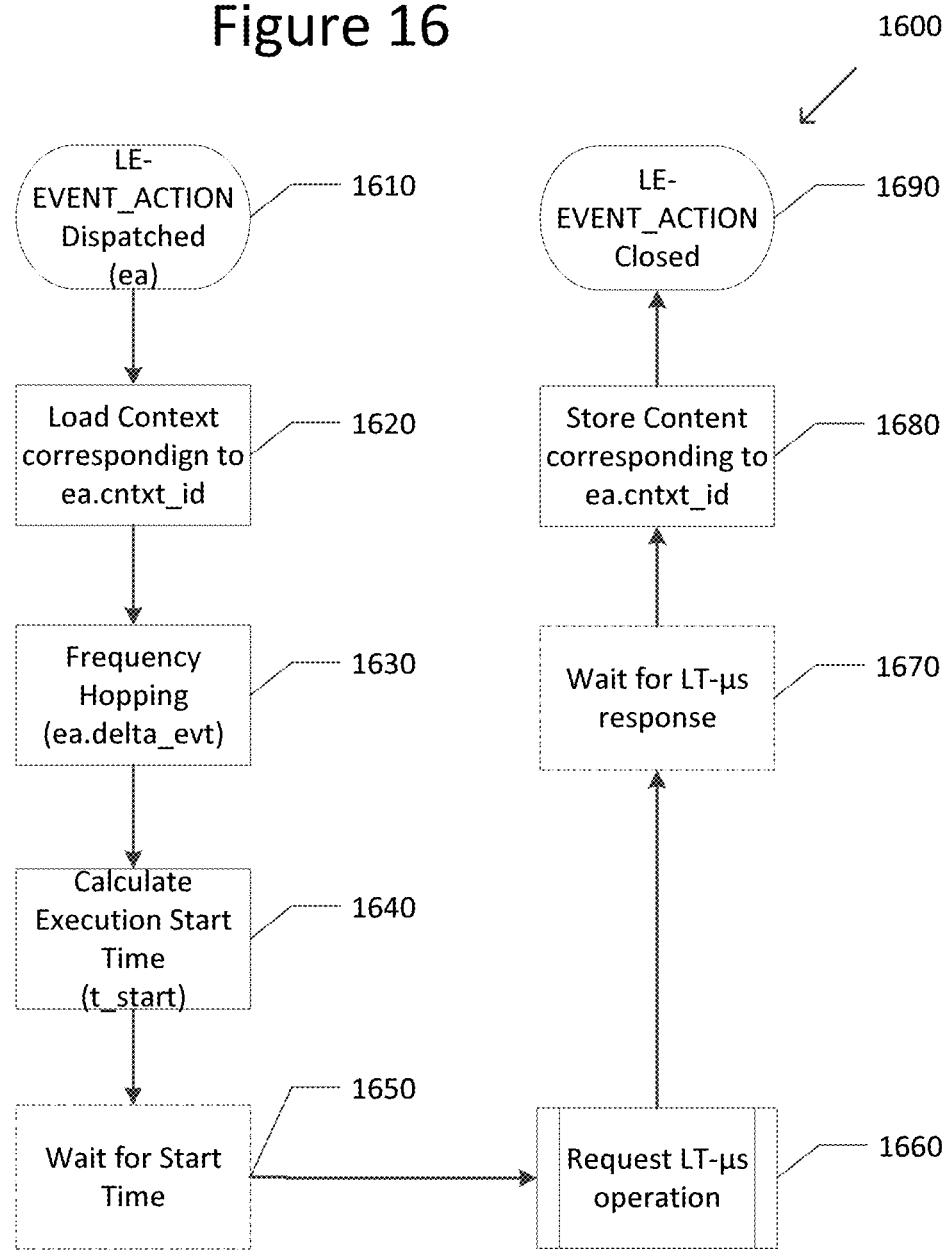
FIG. 16 illustrates a flowchart of a Link Control State Machine (LCSM) sequence.

FIG. 16 illustrates a flowchart 1600 of a Link Control State Machine (LCSM) sequence.

Upon being dispatched an EA (Step 1610), the LCSM 1410 loads the LC 622 context, the logical transport state and configuration, corresponding to the specified logical transport to be serviced (specified by cntxt_id) (Step 1620). The logical transport state specifies the type of LE-Event to execute (connected-slave, connected-master, advertising, scanning, or initiating). As part of the LC 622 context LCSM 1410 also maintains counters, like packet counters and connection event counters, etc.

Afterwards, in Step 1630, the LCSM 1410 evaluates the adaptive frequency hopping rule (if applicable) and the physical channel for the LE-Event is selected. With this information, the LCSM 1410 is able to completely configure the LC 622 for the operation.

Afterwards, in Step 1640, LCSM 1410 calculates the LC 622 triggering time taking into account LC 622 and BLE-PHY 680 setup delays (t_lc_setup), that is, the time at which LC 622 must start execution of the LE-Event (t_start), to meet the over-the-air start time of the LE-Event (t_ota).

At Steps 1650 and 1660, when the LC 622 triggering time is reached, LCSM 1410 request the operation of the correct logical Transport Micro-Sequencer (LT-µS) 1440 through the corresponding req/rsp interface, providing the proper configuration through the corresponding cnfg interface, thus delegating the LE-Event execution to it. During LE-Event execution, every packet operation (transmit or receive) is handled by the corresponding LT-µS 1440 only if the remaining granted time (t_ota+t_grant−actv_time) can fit a packet of maximum length (Step 1670). On LE-Event completion, at Step 1680, LCSM 1410 saves the updated LC 622 context for the link and signals to the exterior the completion of the dispatched EA, alternatively this event closure signaling may be done through the event queue in the queuing system 640 (Step 1690).

The LC contexts are stored in the LCCS 650, and the LCSM 1410 saves and restores LC contexts through the LCCS-LCSM interface.

Finally, for the execution of LE-Events on the ADVB logical transports, LCSM 1410 delegates the device address filtering/analysis procedures to the DAA 660, and receives the indication on whether to transmit a turnaround response or not. This delegation takes place through the interface devaddr_access_req which specifies a single service through which an ADVB PDU is transferred for analysis: rsp←analyze(req_type, src_addr, dst_addr), where req_type is the type of ADVB packet; src_addr is the device address of the sender; dst_addr is the device address of the destination; and rsp is the analysis response, specifying if the packet is accepter or not, if the LE-Event is closed after this packet or not, and whether a BLE-Host notification will be required or not.

The Logical Transport Micro-Sequencers (LT-µS) 1440 handle the logical transport real-time sequencing of transmit, receive and Inter-Frame Spacing (IFS) waiting operations, keep track of the granted time for each LE-Event, and handle the LE-Event closing conditions and the intra LE-Event conditions that require higher layer intervention. Each LT-µS 1440 will be commonly implemented as a reconfigurable finite state machine. Different LT-µS 1440 encode what steps in the sequence require higher level protocol intervention (like device address filtering), and the different timeouts that apply (a timeout during connection establishment is different than a transmit/receive turnaround timeout). The LT-µS 1440 also drives the control-plane to BLE-PHY 680, and triggers the execution of the LC 622 data-plane to ensure it is ready prior to the BLE-PHY 680 execution. Different LT-µS 1440 exist for different logical transports (LE-ACL, ADVB, ScanWindow).

The Logical Transport Controller (LTC) 1420 takes care of PDU-level flow-control and delivery/reliability guarantees. Reliability applies only to LE-ACL logical transport, as ADVB logical transport provides no guarantees of any kind other than real-time channel access. The PDU-level flow-control takes care of interacting with the Queuing Control Block 640 for fetching transmit PDUs, and storing receive PDUs from/into queuing system 640 (through the appropriate queuing system interface).

LTC 1420 offers additional services for LE-ACL transport only. LTC 1420 provides arbitration for logical links. Policies can be configured in LTC 1420 to arbitrate (prioritize) between control-PDUs or data-PDUs when control and data queues for the current link are not empty.

Also, the LTC 1420 provides interlocking for logical links. Interlocking allows a PDU descriptor of one logical link to lock its own queue or the queue of the complementary logical link. A different PDU must then unlock the queue (e.g., a control-PDU that initiates the encryption procedure may lock the data-PDU queue for the same logical transport, and the control-PDU that completes the encryption procedure can then unlock the data-PDU queue). This feature corresponds to the barrier mechanisms in the MO-MACLL 200.

The LTC 1420 provides transmit PDU expiration date parsing capabilities. When transmit-PDU descriptor includes an expiration date, the LTC 1420 omits the packet if the expiration date has elapsed (and interacts with LCSM 1410 to generate an error event to the Link Manager 610).

The LL-Datapath (LLDP) 1420 takes care of bit-stream processing, encryption/decryption, packet assembling and disassembling, Access Address filtering, BLE-PHY data-plane driving.

D. Queuing System Hardware Offload

The only hardware offload contained inside the Queuing System 640 is the Queueing Control Block (QCB). The state of each queue in the queuing system 640 is maintained by the QCB, thus guaranteeing synchronization between the decoupled client accesses. Therefore, the CPU 610, the BLE-LLL 620, and the HCI handler 630 are clients, not owners, of the queueing system 640. The queue state, maintained by the QCB, includes, but is not limited to, the following state variables: full-indication, empty-indication, free-count, used-count, head-pointer, and tail-pointer.

A secondary (optional) objective of the queueing system is to avoid the head-of-the-line blocking problem, avoiding PDUs of one serviced logical transport from blocking PDUs from a different serviced logical transport due to ordering inside the queue. For this purpose, a multi-queue structure is recommended for the PDU queueing system. The QCB 640 offers the following queueing system services to the BLE-LLL 620 through: get_txdata_pdu(cntxt_id), get_txctrl_pdu (cntxt_id), put_rxdata_pdu(cntxt_id), and put_rxctrl_pdu (cntxt_id). In all the previous cases cntxt_id identifies the logical transport corresponding to the queues that are being selected for access.

A third (optional) objective of the queueing system 640 is to decouple the signaling interface, that is, enable in-order persistent storage (until consumed) of notifications of important BLE-LLL 620 events occurring during a hardware driven LE-Event execution. For this purpose the event queue (located inside 640, corresponding with the event queue 250), as shown in FIG. 14, is used. The interfaces for the event queue are analogous to the PDU queue interfaces, but instead of carrying PDUs it carries LC event information. The event queue can only be pushed (or written) by the BLE-LLL 620, and can only be popped (or read) by the CPU 610.

The following examples pertain to further embodiment.

Example 1 is a wireless device, comprising: processor circuitry; and a hardware circuit configured to implement, during an active steady-state of a Medium Access Control/ Link Layer (MAC/LL) with scheduled channel access, a MAC/LL function without processor circuitry intervention, wherein the steady-state is a state that is control packet transmission free for managed connections in connection oriented communications or a continuous broadcast or scan operation in connectionless communications.

In Example 2, the subject matter of Example 1, wherein the processor circuitry is configured to store, prior to entering the steady-state, an executable micro-control by the hardware circuit to implement the MAC/LL function.

In Example 3, the subject matter of Example 1, wherein the hardware circuit is configured to implement, during an idle steady-state of the MAC/LL, the MAC/LL function without processor circuitry intervention.

In Example 4, the subject matter of Example 1, wherein the hardware circuit comprises at least one Power Managed (PM) hardware circuit, which is operable during the active-state of the MAC/LL and is inoperable during an idle-state of the MAC/LL.

In Example 5, the subject matter of Example 1, wherein the hardware circuit comprises at least one Always-On (AON) hardware circuit.

In Example 6, the subject matter of Example 5, wherein the AON hardware circuit is configured to manage a power state of a Power Managed (PM) hardware circuit, which is operable during the active-state of the MAC/LL and is inoperable during an idle-state of the MAC/LL.

In Example 7, the subject matter of Example 1, wherein the wireless device is a connection-oriented communication device, and the steady-state is a state in which a connection schedule or a connection configuration with a second wireless device is unchanging.

In Example 8, the subject matter of Example 7, wherein the steady-state is terminated when an existing connection with a second wireless device is to be disconnected, a new connection with a second wireless device is to be established, or an existing connection is to be reconfigured, either by request of a layer higher than the MAC/LL or by request of a MAC/LL of a second wireless device.

In Example 9, the subject matter of Example 1, wherein the wireless device is a connectionless-oriented wireless device, and the steady-state is a state during which the wireless device performs a continuous broadcast or scan operation, and the MAC/LL reports any discovered second wireless device to a layer higher than the MAC/LL.

In Example 10, the subject matter of Example 9, wherein the steady-state is terminated when the higher layer requests the steady-state to be terminated, or when a Packet Data Unit (PDU) which causes the continuous broadcast or scan operation to terminate is received from a second wireless device.

In Example 11, the subject matter of Example 9, wherein the PDU relates to a connection request.

In Example 12, the subject matter of Example 1, wherein the wireless device is a Wireless Sensor/Actuator Network (WSAN) device.

In Example 13, the subject matter of Example 1, wherein the wireless device is a Bluetooth (BT), BT-Low Energy (LE), ANT, or Long Range (LoRa) device.

In Example 14, the subject matter of Example 1, further comprising: a transport sequencer coupled between the processor circuitry and a transceiver, and configured to exchange Packet Data Units (PDUs) via the transceiver with a second wireless device.

In Example 15, the subject matter of Example 14, wherein: the transport sequencer comprises a data path configured to implement the MAC/LL function, and the MAC/LL function comprises packetizing PDUs for transmission, depacketizing PDUs received, or performing bitstream processing.

In Example 16, the subject matter of Example 14, wherein: the transport sequencer comprises an air interface sequencer configured to implement the MAC/LL function, and the MAC/LL function comprises sequencing transmission, reception, or wait operations.

In Example 17, the subject matter of Example 14, wherein: the transport sequencer comprises a flow controller configured to implement the MAC/LL function, and the MAC/LL function comprises discarding duplicate received PDUs, tracking acknowledgements of transmitted PDUs, emptying acknowledged PDUs from a transmitted PDU queue, or generating empty packets to maintain a packet exchange with a second wireless device.

In Example 18, the subject matter of Example 14, wherein: the transport sequencer comprises a reception flow filter configured to implement the MAC/LL function, and the MAC/LL function comprises separating received PDUs into data and control PDUs, or parsing PDUs for a field value to perform a task.

In Example 19, the subject matter of Example 14, wherein: the transport sequencer comprises a transmission flow selector configured to implement the MAC/LL function, and the MAC/LL function comprises arbitrating between outgoing transmit data PDUs and transmit control PDUs.

In Example 20, the subject matter of Example 14, further comprising: a radio access schedule sequencer configured to implement the MAC/LL function, wherein the MAC/LL function comprises managing connections of the transport sequencer according to a radio access schedule, managing a power sequence of the transport sequencer, or triggering executions by the transport sequencer.

In Example 21, the subject matter of Example 14, further comprising: an address analyzer configured to analyze an address in a PDU packet received from a second wireless device, and determine whether to accept or respond to the PDU packet.

In Example 22, the subject matter of Example 1, further comprising: a host-PDU exchanger configured to implement the MAC/LL function, wherein the MAC/LL function comprises controlling PDU transport/reception to/from a host.

Example 23 is a method of wireless communication, comprising: implementing, by a hardware circuit during an active steady-state of a Medium Access Control/Link Layer (MAC/LL) with scheduled channel access, a MAC/LL function without processor circuitry intervention, wherein the steady-state is a state that is control packet transmission free for managed connections in connection oriented communications or a continuous broadcast or scan operation in connectionless communications.

In Example 24, the subject matter of Example 23, further comprising storing, by the processor circuitry prior to entering the steady-state, wherein the implementing the MAC/LL function comprises executing, by the hardware circuit, an executable micro-control.

In Example 25, the subject matter of Example 23, further comprising: implementing, by the hardware circuit during an idle steady-state of the MAC/LL, the MAC/LL function without processor circuitry intervention.

Example 26 is a wireless device, comprising: processor circuitry; and a hardware means for implementing, during an active steady-state of a Medium Access Control/Link Layer (MAC/LL) with scheduled channel access, a MAC/LL function without processor circuitry intervention, wherein the steady-state is a state that is control packet transmission free for managed connections in connection oriented communications or a continuous broadcast or scan operation in connectionless communications.

In Example 27, the subject matter of Example 26, wherein the processor circuitry is configured to store, prior to entering the steady-state, an executable micro-control by the hardware means for implementing the MAC/LL function.

In Example 28, the subject matter of Example 26, wherein the hardware mean is for implementing, during an idle steady-state of the MAC/LL, the MAC/LL function without processor circuitry intervention.

In Example 29, the subject matter of Example 26, wherein the hardware means comprises at least one Power Managed (PM) hardware means, which is operable during the active-state of the MAC/LL and is inoperable during an idle-state of the MAC/LL.

In Example 30, the subject matter of Example 26, wherein the hardware means comprises at least one Always-On (AON) hardware means.

In Example 31, the subject matter of Example 30, wherein the AON hardware means is for managing a power state of a Power Managed (PM) hardware means, which is operable during the active-state of the MAC/LL and is inoperable during an idle-state of the MAC/LL.

In Example 32, the subject matter of Example 26, wherein the wireless device is a connection-oriented communication device, and the steady-state is a state in which a connection schedule or a connection configuration with a second wireless device is unchanging.

In Example 33, the subject matter of Example 32, wherein the steady-state is terminated when an existing connection with a second wireless device is to be disconnected, a new connection with a second wireless device is to be established, or an existing connection is to be reconfigured, either by request of a layer higher than the MAC/LL or by request of a MAC/LL of a second wireless device.

In Example 34, the subject matter of Example 26, wherein the wireless device is a connectionless-oriented wireless device, and the steady-state is a state during which the wireless device performs a continuous broadcast or scan operation, and the MAC/LL reports any discovered second wireless device to a layer higher than the MAC/LL.

In Example 35, the subject matter of Example 34, wherein the steady-state is terminated when the higher layer requests the steady-state to be terminated, or when a Packet Data Unit (PDU) which causes the continuous broadcast or scan operation to terminate is received from a second wireless device.

In Example 36, the subject matter of Example 34, wherein the PDU relates to a connection request.

In Example 37, the subject matter of Example 26, wherein the wireless device is a Wireless Sensor/Actuator Network (WSAN) device.

In Example 38, the subject matter of Example 26, wherein the wireless device is a Bluetooth (BT), BT-Low Energy (LE), ANT, or Long Range (LoRa) device.

In Example 39, the subject matter of any of Examples 26-38, further comprising: a transport sequencing means coupled between the processor circuitry and a transceiver, for exchanging Packet Data Units (PDUs) via the transceiver with a second wireless device.

In Example 40, the subject matter of Example 39, wherein: the transport sequencing means comprises a data path configured to implement the MAC/LL function, and the MAC/LL function comprises packetizing PDUs for transmission, depacketizing PDUs received, or performing bitstream processing.

In Example 41, the subject matter of Example 39, wherein: the transport sequencing means comprises an air interface sequencing means for implementing the MAC/LL function, and the MAC/LL function comprises sequencing transmission, reception, or wait operations.

In Example 42, the subject matter of Example 39, wherein: the transport sequencing means comprises a flow controller configured to implement the MAC/LL function, and the MAC/LL function comprises discarding duplicate received PDUs, tracking acknowledgements of transmitted PDUs, emptying acknowledged PDUs from a transmitted PDU queue, or generating empty packets to maintain a packet exchange with a second wireless device.

In Example 43, the subject matter of Example 39, wherein: the transport sequencing means comprises a reception flow filter means for implementing the MAC/LL function, and the MAC/LL function comprises separating received PDUs into data and control PDUs, or parsing PDUs for a field value to perform a task.

In Example 44, the subject matter of Example 39, wherein: the transport sequencing means comprises a transmission flow selector configured to implement the MAC/LL function, and the MAC/LL function comprises arbitrating between outgoing transmit data PDUs and transmit control PDUs.

In Example 45, the subject matter of Example 39, further comprising: a radio access schedule sequencing means for implementing the MAC/LL function, wherein the MAC/LL function comprises managing connections of the transport sequencer according to a radio access schedule, managing a power sequence of the transport sequencer, or triggering executions by the transport sequencer.

In Example 46, the subject matter of Example 39, further comprising: an address analyzing means for analyzing an address in a PDU packet received from a second wireless device, and determining whether to accept or respond to the PDU packet.

In Example 47, the subject matter of Example 26, further comprising: a host-PDU exchange means for implementing the MAC/LL function, wherein the MAC/LL function comprises controlling PDU transport/reception to/from a host.

III. Concluding Remarks

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a Central Processing Unit (CPU), microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A wireless device, comprising:
processor circuitry configured (i) to store, prior to entering an active steady-state associated with a communication transport of a Medium Access Control/Link Layer (MAC/LL), a hardware configuration that is separate from a processor circuitry configuration, wherein the hardware configuration is associated with performing a MAC/LL function, and (ii) upon entering the active steady-state, the processor circuitry then enters a sleep state, such that the sleep state of the processor circuitry occurs during a portion of a steady-state mode of operation of the communication transport; and
a hardware circuit separate from the processor circuitry, wherein the hardware circuit is configured to implement, during the active steady-state, the MAC/LL function in accordance with the stored hardware configuration while the processor circuitry is in the sleep state, and without processor circuitry intervention;
wherein the active steady-state is part of the steady-state mode of operation, the steady-state mode of operation being a state that is control packet transmission free for managed connections in connection oriented communications or a continuous broadcast or scan operation in connectionless communications.

2. The wireless device of claim 1, wherein the stored configuration of the hardware circuit includes one or more micro-controls that are executable by the hardware circuit to implement the MAC/LL function.

3. The wireless device of claim 1, wherein the steady-state mode of operation includes an idle-state, and
wherein the hardware circuit is configured to implement, during the idle-state, the MAC/LL function while the processor circuitry is in the sleep state.

4. The wireless device of claim 1, wherein the hardware circuit comprises at least one Power Managed (PM) hardware circuit, which is operable during the active-state of the MAC/LL and is inoperable during an idle-state of the MAC/LL.

5. The wireless device of claim 1, wherein the hardware circuit comprises at least one Always-On (AON) hardware circuit.

6. The wireless device of claim 5, wherein the AON hardware circuit is configured to manage a power state of a Power Managed (PM) hardware circuit, which is operable during the active-state of the MAC/LL and is inoperable during an idle-state of the MAC/LL.

7. The wireless device of claim 1, wherein the wireless device is a connection-oriented communication device, and the steady-state is a state in which a connection schedule or a connection configuration with a second wireless device is unchanging.

8. The wireless device of claim 7, wherein the steady-state is terminated when an existing connection with a second wireless device is to be disconnected, a new connection with a second wireless device is to be established, or an existing connection is to be reconfigured, either by request of a layer higher than the MAC/LL or by request of a MAC/LL of a second wireless device.

9. The wireless device of claim 1, wherein the wireless device is a connectionless-oriented wireless device, and the steady-state is a state during which the wireless device performs a continuous broadcast or scan operation, and the MAC/LL reports any discovered second wireless device to a layer higher than the MAC/LL.

10. The wireless device of claim 9, wherein the steady-state is terminated when the higher layer requests the steady-state to be terminated, or when a Packet Data Unit (PDU) which causes the continuous broadcast or scan operation to terminate is received from a second wireless device.

11. The wireless device of claim 9, wherein the PDU relates to a connection request.

12. The wireless device of claim 1, wherein the wireless device is a Wireless Sensor/Actuator Network (WSAN) device.

13. The wireless device of claim 1, wherein the wireless device is a Bluetooth (BT), BT-Low Energy (LE), ANT, or Long Range (LoRa) device.

14. The wireless device of claim 1, further comprising:
a transport sequencer coupled between the processor circuitry and a transceiver, and configured to exchange Packet Data Units (PDUs) via the transceiver with a second wireless device.

15. The wireless device of claim 14, wherein:
the transport sequencer comprises a data path configured to implement the MAC/LL function, and
the MAC/LL function comprises packetizing PDUs for transmission, depacketizing PDUs received, or performing bitstream processing.

16. The wireless device of claim 14, wherein:
the transport sequencer comprises an air interface sequencer configured to implement the MAC/LL function, and
the MAC/LL function comprises sequencing transmission, reception, or wait operations.

17. The wireless device of claim 14, wherein:
the transport sequencer comprises a flow controller configured to implement the MAC/LL function, and
the MAC/LL function comprises discarding duplicate received PDUs, tracking acknowledgements of transmitted PDUs, emptying acknowledged PDUs from a transmitted PDU queue, or generating empty packets to maintain a packet exchange with a second wireless device.

18. The wireless device of claim 14, wherein:
the transport sequencer comprises a reception flow filter configured to implement the MAC/LL function, and
the MAC/LL function comprises separating received PDUs into data and control PDUs, or parsing PDUs for a field value to perform a task.

19. The wireless device of claim 14, wherein:
the transport sequencer comprises a transmission flow selector configured to implement the MAC/LL function, and
the MAC/LL function comprises arbitrating between outgoing transmit data PDUs and transmit control PDUs.

20. The wireless device of claim 14, further comprising:
a radio access schedule sequencer configured to implement the MAC/LL function,
wherein the MAC/LL function comprises managing connections of the transport sequencer according to a radio access schedule, managing a power sequence of the transport sequencer, or triggering executions by the transport sequencer.

21. The wireless device of claim 14, further comprising:
an address analyzer configured to analyze an address in a PDU packet received from a second wireless device, and determine whether to accept or respond to the PDU packet.

22. The wireless device of claim 1, further comprising:
a host-PDU exchanger configured to implement the MAC/LL function,
wherein the MAC/LL function comprises controlling PDU transport/reception to/from a host.

23. A method of wireless communication, comprising:
storing, by processor circuitry prior to entering an active steady-state associated with a communication transport of a Medium Access Control/Link Layer (MAC/LL), a hardware configuration that is separate from a processor circuitry configuration,
wherein the hardware configuration is associated with performing a MAC/LL function;
entering, by the processor circuitry, a sleep state upon entering the active steady-state, such that the sleep state of the processor circuitry occurs during a portion of a steady-state mode of operation of the communication transport;
implementing, by a hardware circuit that is separate from the processor circuitry during the active steady-state, the MAC/LL function in accordance with the stored hardware configuration while the processor circuitry is in the sleep state, and without processor circuitry intervention,
wherein the active steady-state is part of the steady-state mode of operation, the steady-state mode of operation being a state that is control packet transmission free for managed connections in connection oriented communications or a continuous broadcast or scan operation in connectionless communications.

24. The method of claim 23, wherein the storing of the hardware configuration, by the processor circuitry prior to entering the steady-state, includes storing one or more micro-controls that are executable by the hardware circuit to implement the MAC/LL function.

25. The method of claim 23, wherein the steady-state mode of operation includes an idle-state, and further comprising:
implementing, by the hardware circuit during the idle-state, the MAC/LL function while the processor circuitry is in the sleep state.

* * * * *